(12) United States Patent
Jung et al.

(10) Patent No.: US 9,432,967 B2
(45) Date of Patent: Aug. 30, 2016

(54) METHOD FOR REPORTING INFORMATION BASED ON LOCATION ESTIMATION AND ESTIMATING LOCATION IN WIRELESS COMMUNICATION SYSTEM, AND APPARATUS FOR SUPPORTING SAME

(71) Applicant: LG ELECTRONICS INC., Seoul (KR)

(72) Inventors: Sunghoon Jung, Anyang-si (KR); Youngdae Lee, Anyang-si (KR); Sungjun Park, Anyang-si (KR); Seungjune Yi, Anyang-si (KR); Jaewook Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/399,843

(22) PCT Filed: May 9, 2013

(86) PCT No.: PCT/KR2013/004072
§ 371 (c)(1),
(2) Date: Nov. 7, 2014

(87) PCT Pub. No.: WO2013/169027
PCT Pub. Date: Nov. 14, 2013

(65) Prior Publication Data
US 2015/0141040 A1 May 21, 2015

Related U.S. Application Data

(60) Provisional application No. 61/645,022, filed on May 9, 2012.

(51) Int. Cl.
*G01S 5/00* (2006.01)
*H04W 64/00* (2009.01)
(Continued)

(52) U.S. Cl.
CPC .......... *H04W 64/006* (2013.01); *G01S 5/0009* (2013.01); *G01S 5/02* (2013.01); *H04W 24/08* (2013.01); *H04W 64/00* (2013.01)

(58) Field of Classification Search
CPC . H04W 64/006; H04W 24/08; H04W 64/00; G01S 5/0009; G01S 5/02
See application file for complete search history.

(56) References Cited

U.S. PATENT DOCUMENTS

| 2012/0082051 A1* | 4/2012 | Kim | H04W 24/10 370/252 |
| 2013/0148534 A1* | 6/2013 | Jung | H04W 24/02 370/252 |

(Continued)

FOREIGN PATENT DOCUMENTS

| KR | 10-2006-0016869 A | 2/2006 |
| KR | 10-1097727 B1 | 12/2011 |

(Continued)

*Primary Examiner* — Mehmood B Khan
(74) *Attorney, Agent, or Firm* — Birch, Stewart, Kolasch & Birch, LLP

(57) ABSTRACT

According to one embodiment, provided is a method for user equipment reporting information based on location estimation in a wireless communication system. The method comprises: transmitting to a network an estimation result from a specific point in time; obtaining information based on a first location estimation from a first point in time; transmitting to the network the information based on the first location estimation; obtaining information based on a second location estimation from a second point in time; and transmitting to the network the information based on the second location estimation. A location related to the estimation result is estimated by the network on the basis of the information based on the first location estimation and the information based on the second location estimation.

8 Claims, 19 Drawing Sheets

(51) Int. Cl.
*G01S 5/02* (2010.01)
*H04W 24/08* (2009.01)

(56) References Cited

U.S. PATENT DOCUMENTS

| | | | | |
|---|---|---|---|---|
| 2013/0170484 A1* | 7/2013 | Kang | ..................... | G01S 5/021 370/338 |
| 2013/0235749 A1* | 9/2013 | Cho | ..................... | G01S 5/0252 370/252 |
| 2013/0329593 A1* | 12/2013 | Kim | ..................... | H04W 24/10 370/252 |
| 2013/0337789 A1* | 12/2013 | Johnson | ................. | H04W 4/02 455/414.1 |
| 2014/0078973 A1* | 3/2014 | Kazmi | .................... | H04W 8/22 370/329 |
| 2014/0233457 A1* | 8/2014 | Koutsimanis | .......... | H04J 11/005 370/328 |
| 2015/0094102 A1* | 4/2015 | Jung | ..................... | H04W 24/02 455/456.6 |

FOREIGN PATENT DOCUMENTS

| | | | | | |
|---|---|---|---|---|---|
| KR | 10-2012-0005193 A | | 1/2012 | | |
| KR | 10-2012-0040010 A | | 4/2012 | | |
| KR | 10-2012-0041972 A | | 5/2012 | | |
| WO | WO 2012005466 | * | 1/2012 | | |
| WO | WO 2012053791 A2 | * | 4/2012 | ........... | G01S 5/0252 |
| WO | WO 2012111950 A2 | * | 8/2012 | ............ | H04W 24/10 |

* cited by examiner

METHOD FOR REPORTING INFORMATION BASED ON LOCATION ESTIMATION AND ESTIMATING LOCATION IN WIRELESS COMMUNICATION SYSTEM, AND APPARATUS FOR SUPPORTING SAME

CROSS REFERENCE TO RELATED APPLICATIONS

This application is the National Phase of PCT International Application No. PCT/KR2013/004072, filed on May 9, 2013, which claims priority under 35 U.S.C. 119(e) to U.S. Provisional Application No. 61/645,022, filed on May 9, 2012, all of which are hereby expressly incorporated by reference into the present application.

BACKGROUND OF THE INVENTION

1. Field of the Invention

The present invention relates to wireless communications and, more particularly, to a method for reporting the information based on location estimation, and for estimating location and apparatus for supporting the same.

2. Related Art

The 3rd Generation Partnership Project (3GPP) long term evolution (LTE) which is an improvement of Universal Mobile Telecommunications System (UMTS) is introduced as 3GPP release 8. The 3GPP LTE uses orthogonal frequency division multiple access (OFDMA) in downlink and uses Single Carrier-frequency division multiple access (SC-FDMA) in uplink. And multiple input multiple output (MIMO) having maximum 4 antennas is adopted. Recently, the 3GPP LTE-Advanced (LTE-A) which is an evolution of the 3GPP LTE has been discussed.

In order to optimize the performance of network, the network acquires the measurement result from a user equipment. In this time, the network acquires the relevant location information together with the measurement result and enables to optimize the network performance more effectively. For the optimization of the network, operators may acquire the measurement result and the location information using the user equipment, and it is called Minimization of Driving Test (MDT).

The user equipment acquires the measurement result and performs positioning in order to acquire the relevant location information. However, there is going to occur the discrepancy between the time of acquiring the measurement result and the time of acquiring the location information. In this case, the network is not available to acquire the location information together with the measurement result, and consequently it causes the problem that the network performance may not be optimized effectively. In addition, even though the location information is provided, the problem of discrepancy between the measurement result and the location information being guaranteed may occur in the aspect of the network.

SUMMARY OF THE INVENTION

The technical object of the present invention is to provide a method for reporting the information based on location estimation in wireless communication system, and for estimating the location based on it.

In an aspect of the present invention, a method for reporting information based on location estimation performed by a user equipment in a wireless communication system is provided. The method includes transmitting a measurement result at a specific time to network, acquiring information based on a first location estimation at a first time, transmitting the information based on the first location estimation to the network, acquiring information based on a second location estimation at a second time, and transmitting the information based on the second location estimation to the network. The location related to the measurement result is estimated by the network based on the information based on the first location estimation and the information based on the second location estimation.

If the user equipment does not transmit the information for location related to the measurement result with the measurement result, wherein the information based on the first location estimation and the information based on the second location estimation are acquired.

The information based on the first location estimation may include a first location information for the location of user equipment at the first time and a first time information for the first time. The information based on the second location estimation may include a second location information for the location of user equipment at the second time and a second time information for the second time The information based on the first location estimation may include first location information for the location of user equipment at the first time and first time information for the first time. The information based on the second location estimation may include second location information for the location of user equipment at the second time and second time information for the second time.

The method may further comprise getting setup of interpolation parameter for deciding whether to transmit the information based on the first location estimation and the information based on the second location estimation from the network.

The interpolation parameter may include Tmax parameter that indicates a maximum time interval between a specific time or a time of acquiring the location information and a time of acquiring the next location information.

The information based on the first location estimation may be transmitted to the network if the time interval between the specific time and the first time is smaller than the maximum time interval indicated by the Tmax parameter.

The information based on the second location estimation may be transmitted to the network if the information based on the first location estimation is transmitted to the network and the time interval between the first time and the second time is smaller than the maximum time interval indicated by the Tmax parameter.

The method may further comprise transmitting the failure indication message of acquiring initial location information to the network, if the information based on the first location estimation and the information based on the second location estimation are not transmitted to the network.

The interpolation parameter may include Dmax parameter that indicates a maximum moving distance of the user equipment between a specific time or a time of acquiring the location information and a time of acquiring the next location information.

The information based on the first location estimation may be transmitted to the network if a moving distance of the user equipment between the specific time and the first time is smaller than the maximum moving distance indicated by the Dmax parameter.

The moving distance $D_{t0\text{-}t1}$ of the user equipment between the specific time and the first time may be calculated by the equation below. $D_{t0\text{-}t1}=v(t_1)*(t_1-t_0)$ Herein, $t_1$ represents the first time, $t_0$ represents the specific time, and $v(t_1)$ represents a speed of the user equipment at $t_1$.

The information based on the second location estimation may be transmitted to the network if the information based on the first location estimation is transmitted to the network and the moving distance of the user equipment between the first time and the second time is smaller than the maximum moving distance indicated by the Dmax parameter.

The moving distance Dt1−t2 of the user equipment between the first time and the second time may be calculated by the equation below. Dt1−t2=v(t2)*(t2−t1) Herein, t1 represents the first time, t2 represents the second time, and v(t2) represents a speed of the user equipment at t2.

In another aspect of the present invention, a wireless apparatus performing in a wireless communication system is provided. The wireless apparatus includes a radio frequency (RF) unit that transmits and receives a radio signal, and a processor operating functionally connected with the RF unit. The process is configured to perform transmitting a measurement result at a specific time to network, acquiring information based on a first location estimation at a first time, transmitting the information based on the first location estimation to the network, acquiring information based on a second location estimation at a second time, and transmitting the information based on the second location estimation to the network. The location related to the measurement result is estimated by the network based on the information based on the first location estimation and the information based on the second location estimation.

Even in the case that the relevant location information has not been acquired until reporting the measurement result, the network is available to estimate the location in relation to the measurement result through the information based on the location estimation. Accordingly, the network performs the optimization based on the measurement result received and the location information estimated to provide relatively high-quality service for a user equipment.

When reporting the information based on the location estimation to the network, the user equipment checks the validity of the information based on the interpolation parameter. Through this, it is guaranteed that the location information included in the information based on the location estimation has correlation with the location information in relation to the measurement result, and therefore the network may secure more higher accuracy in performing the location estimation.

DESCRIPTION OF EXEMPLARY EMBODIMENTS

Figure 1:
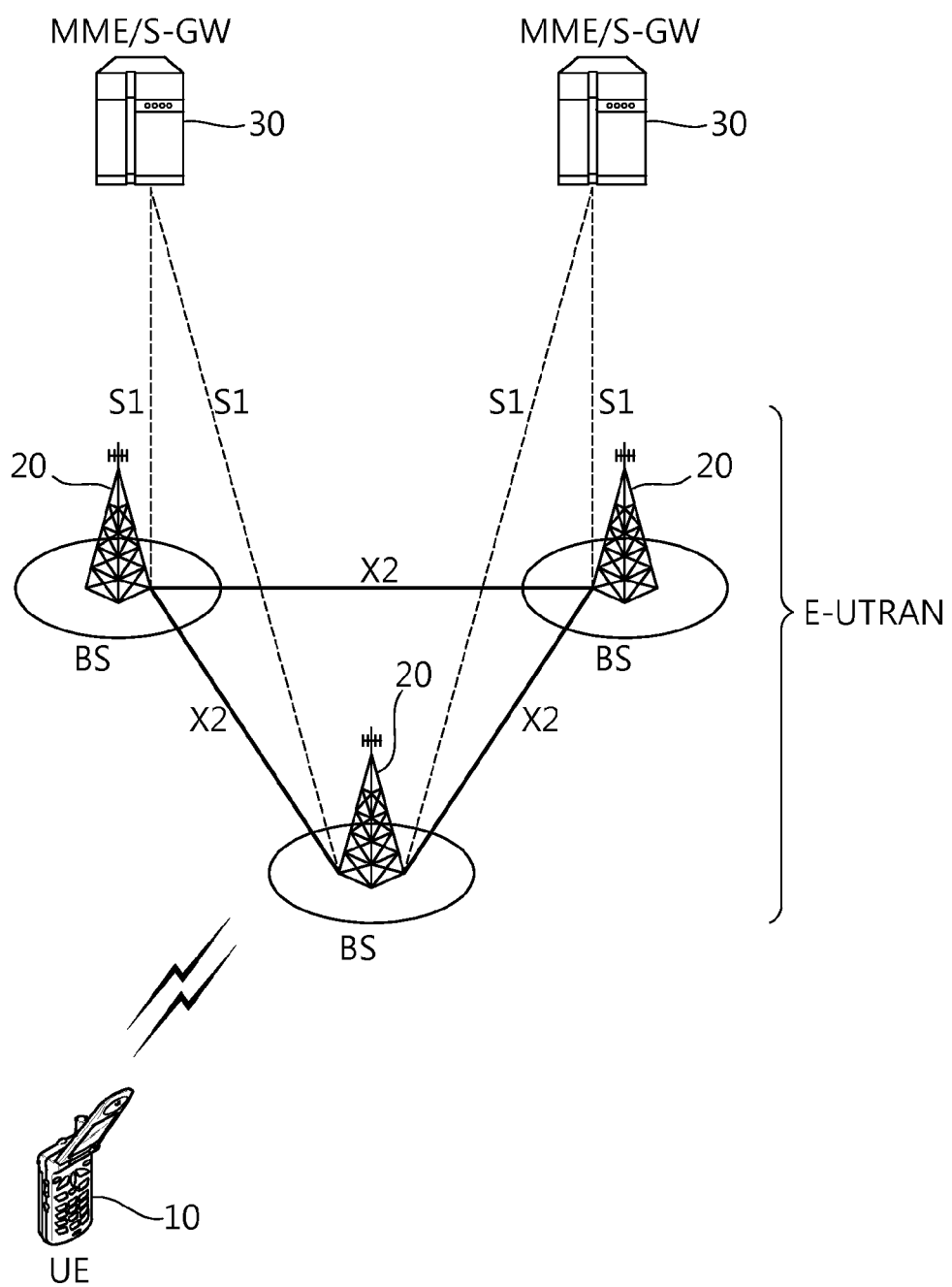
FIG. 1 illustrates a wireless communication system to which the present invention is applied.

FIG. 1 illustrates a wireless communication system to which the present invention is applied. This may also be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other through an X2 interface. The base station 20 is connected with an evolved packet core (EPC) 30 through an S1 interface, in more detail, a mobility management entity (MME) through an S1 MME and a serving gateway (S-GW) through an S1-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based three lower layers of an open system interconnection (OSI) reference model which is widely known in a communication system and among them, a physical layer that belongs to the first layer provides an information transfer service using a physical channel and a radio resource control (RRC) layer positioned on the third layer serves to control radio resources between the UE and the network. For this, the RRC layer exchanges an RRC message between the UE and the base station.

Figure 2:
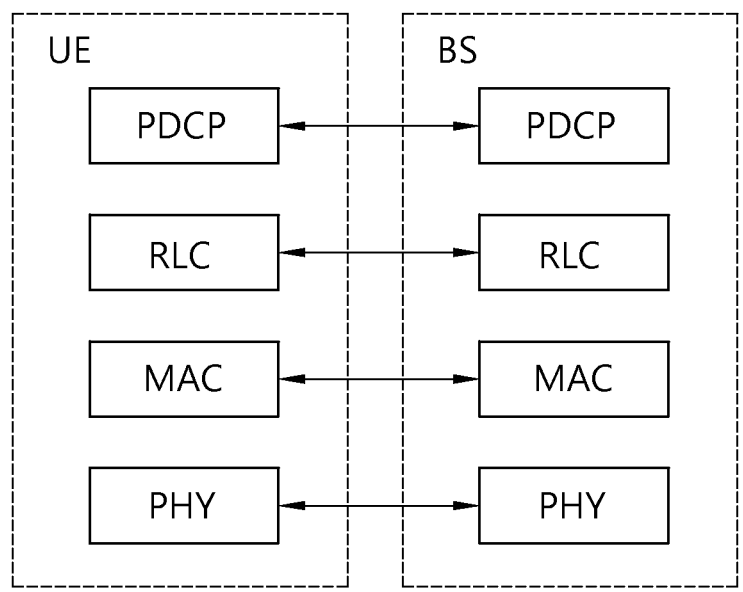
FIG. 2 is a block diagram illustrating a radio protocol architecture for a user plane.
Figure 3:
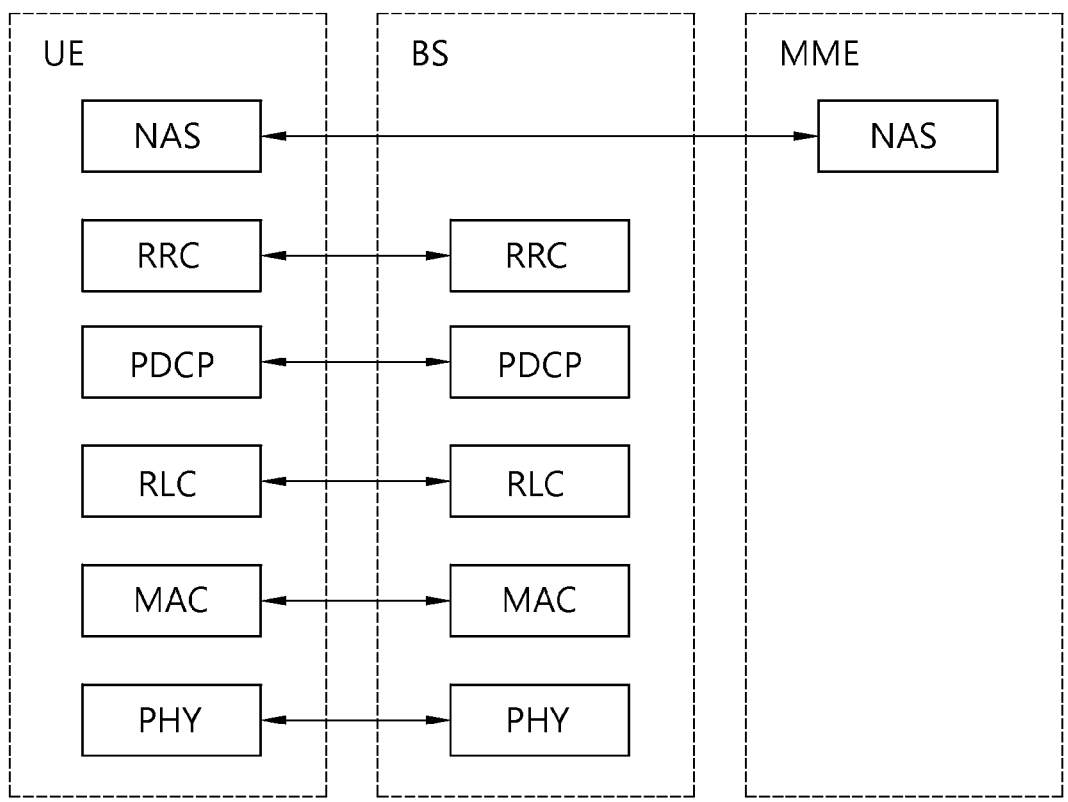
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. A data plane is a protocol stack for user data transmission and the control plane is a protocol stack for transmitting a control signal.

Referring to FIGS. 2 and 3, a physical (PHY) layer provides the information transfer service to an upper layer by using the physical channel. The physical layer is connected with a medium access control (MAC) layer as an upper layer through a transport channel. Data move between the MAC layer and the physical layer through the transport channel. The transport channel is classified depending on a transmission method and a transmission feature through a radio interface.

Data move between different physical layers, that is, between physical layers of a transmitter and a receiver through the physical channel. The physical channel may be modulated by orthogonal frequency division multiplexing (OFDM) and uses a time and a frequency as the radio resource.

A function of the MAC layer includes mapping between a logic channel and the transport channel, and multiplexing/demultiplexing to a transport block provided to the physical channel onto the transport channel of an MAC service data unit (SDU) that belongs to the logic channel. The MAC layer provides a service to a radio link control (RLC) layer through the logic channel.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

The radio resource control (RRC) layer is defined only on the control plane. The RRC layer serves to control the logic channel, the transport channel and the physical channels in association with configuration, re-configuration, and release of radio bearers. The RB means a logic route provided by the first layer (PHY layer) and the second layers (the MAC layer, the RLC layer, and the PDCP layer) in order to transfer data between the UE and the network.

A function of a packet data convergence protocol (PDCP) layer on the user plane includes transferring of user data, header compression, and ciphering. A function of a packet data convergence protocol (PDCP) layer on the user plane includes transferring of control plane data and ciphering/integrity protection.

Setting the RB defines features of the radio protocol layer and channel in order to provide a specific service and means a process of setting respective detailed parameters and operating methods. The RB may be re-divided into two types of a signaling RB (SRB) and a data RB (DRB). The SRB is used as a passage for transmitting the RRC message on the control plane and the DRB is used as a passage for transmitting the user data on the user plane.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, the downlink transport channel includes a downlink shared channel (SCH) for transmitting user traffic or a control message. Traffic or a control message of a downlink multicast or broadcast service may be transported through the downlink SCH or transported through an additional downlink multicast channel (MCH). Meanwhile, an uplink transport channel for transporting data from the UE to the network includes a random access channel (RACH) for transporting an initial control message and besides, an uplink shared channel (SCH) for transporting the user traffic or control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of OFDM symbols in a time domain and a plurality of subcarriers in a frequency domain. One sub-frame is constituted by the plurality of OFDM symbols in the time domain. A resource block as a resource allocation unit is constituted by the plurality of OFDM symbols and the plurality of subcarriers. Further, each sub-frame may use specific subcarriers of specific OFDM symbols (e.g., a first OFDM symbol) of a corresponding sub-frame for the physical downlink control channel (PDCCH), that is, an L1/L2 control channel. A transmission time interval (TTI) is a unit time of transmitting the sub-frame.

Hereinafter, the RRC state and the RRC connection method of the UE will be described in detail.

The RRC state represents whether the RRC layer of the UE is logically connected with the RRC layer of the E-UTRAN and a case in which both RRC layers are logically connected to each other is called the RRC connection state and a case in which both RRC layers are not logically connected to each other is called the RRC idle state. Since the RRC connection exists in the UE in the RRC connection state, the E-UTRAN may determine the existence of the corresponding UE by the unit of a cell to thereby effectively control the UE. On the contrary, the E-UTRAN may not determine the UE in the RRC idle state and a core network (CN) is managed by the unit of a tracking area which a region unit larger than the cell. That is, it is determined whether the UE in the RRC idle state exists by the unit of a large region, and the UE needs to move to the RRC connection state in order to receive a general mobile communication service such as voice or data.

When a user first turns on a power supply of the UE, the UE first retrieves an appropriate and thereafter, the UE stays in the RRC idle state in the corresponding cell. The UE in the RRC idle state establishes the RRC connection with the E-UTRAN through an RRC connection procedure at least when the UE in the RRC idle state needs to make the RRC connection, and is transited to the RRC connections state. Cases in which the UE in the RRC idle state needs to make the RRC connection are various, and for example, uplink data transmission is required due to a user's call attempt or when a paging message is received from the E-UTRAN, the cases may include response message transmission thereto.

A non-access stratum layer (NAS) located above the RRC layer performs functions such as session management and mobility management.

In order to manage mobility of the UE on the NAS layer, two states of EPS mobility management (EMM)-REGIS- TERED and EMM-DEREGISTERED are defined and both states are applied to the UE and the MME. An initial UE is in the EMM-DEREGISTERED state and the UE performs a process of registering the initial UE in a corresponding network through an initial attach procedure in order to access the network. When the attach procedure is successfully performed, the UE and the MME are in the EMM-REGISTERED state.

In order to manage a signaling connection between the UE and the EPC, two states of an EPS connection management (ECM)-IDLE state and an ECM-CONNECTED state are defined and both states are applied to the UE and the MME. When the UE in the ECM-IDLE state makes the RRC connection with the E-UTRAN, the corresponding UE is in the ECM-CONNECTED state. When the MME in the ECM-IDLE state makes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE based mobility associated procedure such as cell selection or cell reselection without the need for receiving a command of the network. On the contrary, when the UE is in the ECM-CONNECTED state, the mobility of the UE is managed by the command of the network. When the position of the UE in the ECM-IDLE state is different from a position which the network knows, the UE notifies a corresponding position of the UE to the network through a tracking area update procedure.

Next, the system information will be described.

The system information includes required information which the UE needs to know to access the base station. Therefore, the UE needs to receive all of the system information before accessing the base station and further, the UE continuously needs to have latest system information. In addition, since the system information is information which all UEs in one cell need to know, the base station periodically transmits the system information.

According to Phrase 5.2.2 of 3GPP TS 36.331 V8.7.0 (2009-09) "Radio Resource Control (RRC); Protocol specification (Release 8)", the system information is divided in to a master information block (MIB), a scheduling block (SB), and a system information block (SIB). The MIB allows the UE to know a physical component, for example, a bandwidth. The SB allows the UE to know transmission information of the SIBs, for example, a transmission period, and the like. The SIB is an aggregate of associated system information. For example, any SIB includes only information on a neighboring cell and any SIB includes only information on an uplink wireless channel used by the UE.

In general, a service which the network provides to the UE may be divided into three types. Further, the UE differently recognizes even a type of the cell by considering which service the UE receives. The service type will be first described below and thereafter, the type of the cell will be described.

1) Limited service: The service may provide an emergency call and an earthquake and Tsunami warning system (ETWS), and provide the emergency call and the earthquake and Tsunami warning system (ETWS) in an acceptable cell.

2) Normal service: The service may mean a public use general service and may provide the public use general service in a suitable or normal cell.

3) Operator service: The service may mean a service for a communication network operator and only the communication network operator may use the cell and a general user may not use the cell.

The type of the cell may be divided as below in association with the service type provided by the cell.

1) Acceptable cell: Cell where the UE may receive the limited service. The cell is a cell that is not barred in terms of the corresponding UE and satisfies a cell selection criterion of the UE.

2) Suitable cell: Cell where the UE may receive the suitable service. The cell satisfies a condition of the acceptable cell and simultaneously, satisfies additional conditions. As the additional conditions, the cell needs to belong to a public land mobile network (PLMN) which the corresponding UE may access and needs to be a cell where execution of the tracking area update procedure of the UE is not barred. When the corresponding cell is the CSG cell, the corresponding cell needs to be a cell where the UE may access the cell as a CSG member.

3) Barred cell: The cell is a cell where information indicating that the corresponding cell is a cell barred through the system information is broadcasted.

4) Reserved cell: The cell is a cell where information indicating that the corresponding cell is a cell reserved through the system information is broadcasted.

Figure 4:
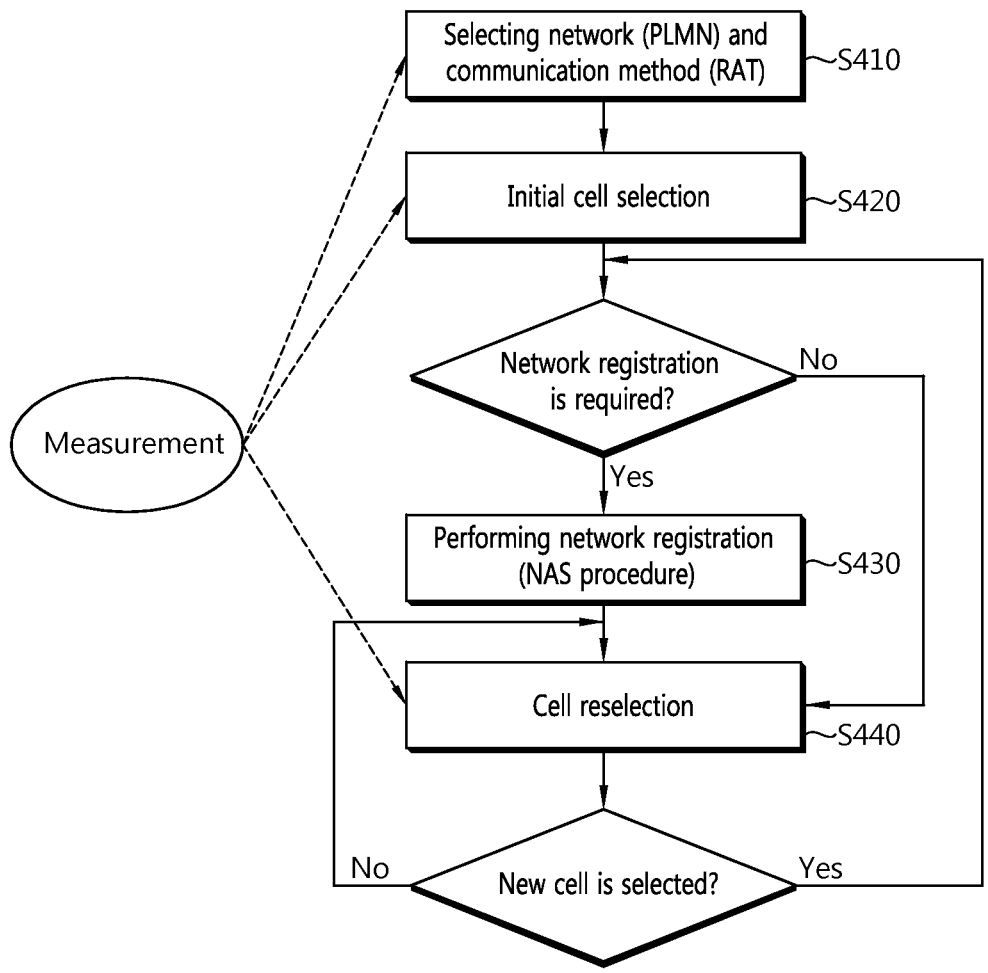
FIG. 4 is a flowchart illustrating an operation of a UE in an RRC idle state.

FIG. 4 is a flowchart illustrating an operation of a UE in an RRC idle state. FIG. 4 illustrates a procedure of registering a UE of which initial power is turned on in the network through a cell selection process and thereafter, cell reselection is performed as necessary.

Referring to FIG. 4, the UE selects radio access technology (RAT) for communicating with the public land mobile network from which the UE itself intends to receive the service (step, S410). Information on the PLMN and the RAT may be selected by a user of the UE and the information stored in a universal subscriber identity module (USIM) may be used.

The UE selects a cell having a largest value among cell having measured larger signal intensity or quality than specific values (cell selection) (step, S420). The UE of which power is turned on performs the cell selection and the execution of the cell selection may be called initial cell selection. A cell selection procedure will be described below in detail. After the cell selection, the UE receives the system information which the base station periodically sends. The aforementioned specific value represents a value defined in the system in order to receive an assurance for quality of a physical signal in transmitting/receiving data. Therefore, the value may vary depending on the applied RAT.

When network registration is required, the UE performs a network registration procedure (step, S430). The UE registers its own information (e.g., IMSI) in order to receive a service (e.g., paging) from the network. The UE does not register the information in the accessed network whenever selecting the cell, and registers the information when information (e.g., a tracking area identity; TAI) of the network that receives from the system information is different from information on a network known by the UE.

The UE performs the cell reselection based on a service environment provided by the cell or an environment of the UE (step, S440). When a value of measured intensity or quality of the signal from a base station from which the UE receives the service is smaller than a value measured from a base station of a neighboring cell, the UE selects one of other cells that provide a more excellent signal feature than the cell of the base station accessed by the UE. This process is distinguished from the initial cell selection as Process No. 2 to be cell re-selection. In this case, a temporal constraint is given in order to prevent the cell from being frequently reselected with the variation of the signal feature. A cell selection procedure will be described below in detail.

Figure 5:
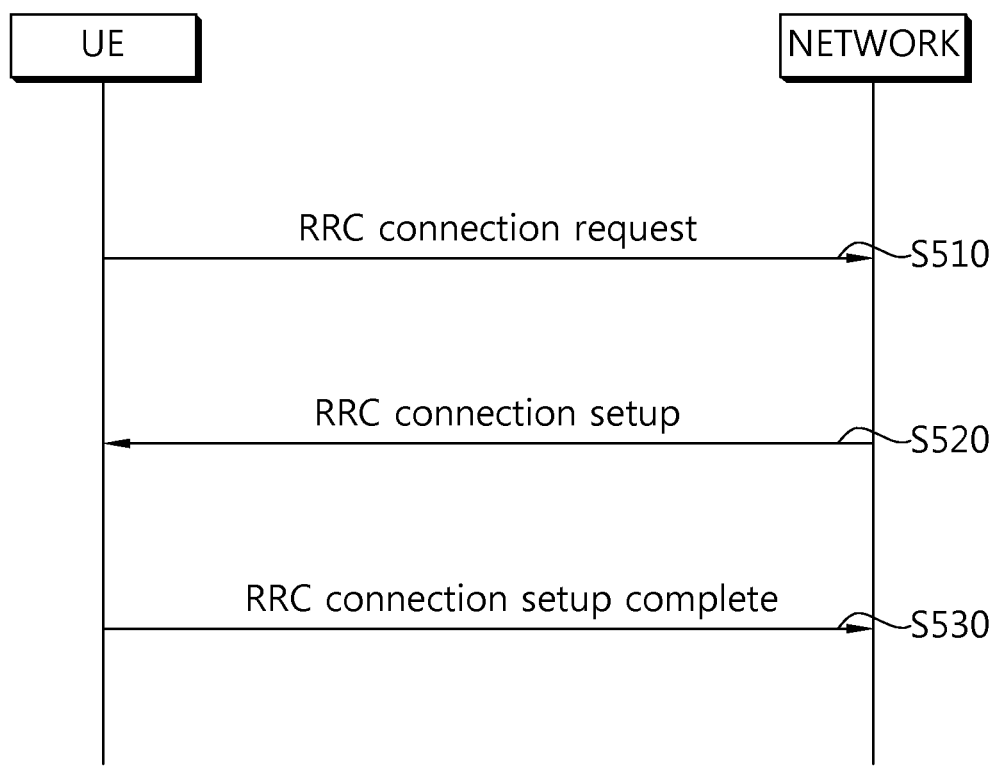
FIG. 5 is a flowchart illustrating a procedure of establishing an RRC connection.

FIG. 5 is a flowchart illustrating a procedure of establishing an RRC connection.

The UE sends to the network an RRC connection request message for requesting the RRC connection (step, S510). The network sends an RRC connection setup message as a response to the RRC connection request (step, S520). The UE enters an RRC connection mode after receiving the RRC connection setup message.

The UE sends to the network an RRC connection setup complete message used to verify successful completion of establishing the RRC connection (step, S530).

Figure 6:
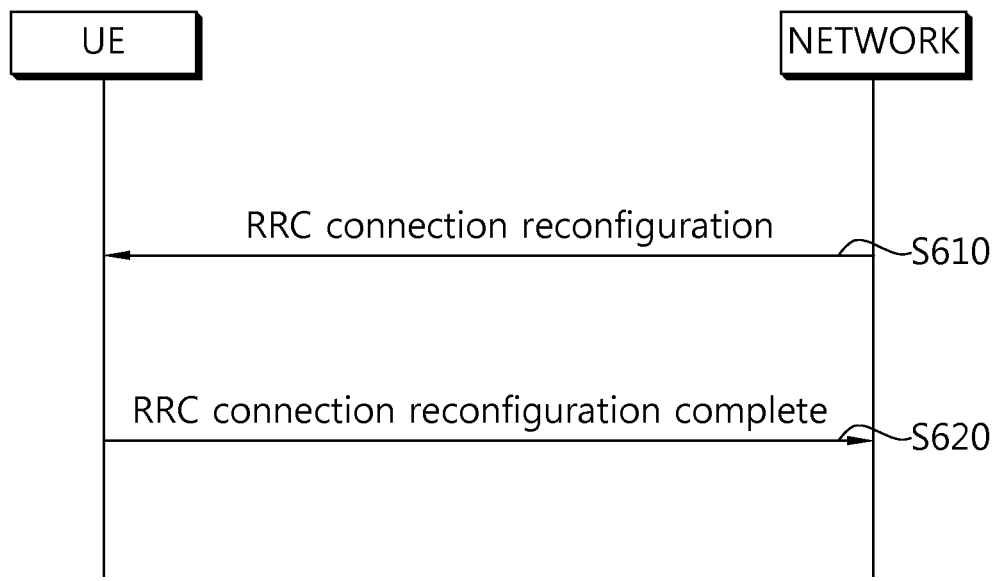
FIG. 6 is a flowchart illustrating a procedure of reconfiguring the RRC connection.

FIG. 6 is a flowchart illustrating a procedure of reconfiguring the RRC connection. The RRC connection reconfiguration is used to modify the RRC connection. The RRC connection reconfiguration is used for perform RB establishment/modification/release, handover, and measurement setup/modification/release.

The network sends to the UE an RRC connection setup message for modifying the RRC connection (step, S610). The UE sends to the network an RRC connection reconfiguration complete message used to verify successful completion of establishing the RRC connection reconfiguration as a response to the RRC connection reconfiguration (step, S620).

Hereinafter, the public land mobile network (PLMN) will be described.

The PLMN is a network that is deployed and operated by mobile network operators. Each mobile network operator operates one or more PLMN. Each PLMN may be distinguished by Mobile Country Code (MCC) and Mobile Network Code (MNC). The PLMN information of cells is included in the system information and broadcasted.

For selecting PLMN, cells and reselecting cells, various types of PLMNs may be considered by a UE.

HPLMN (Home PLMN): The PLMN having MCC and MNC which are respectively matched to MCC and MNC of a UE IMSI.

EHPLMN (Equivalent HPLMN): The PLMN handled to be equivalent to the HPLMN.

RPLMN (Registered PLMN): The PLMN of which the location is successfully registered.

EPLMN (Equivalent PLMN): The PLMN handled to be equivalent to the RPLMN.

Each consumer of the mobile service subscribes to the HPLMN. When the general service is provided for a UE through the HPLMN or the EHPLMN, the UE is not in the roaming state. On the other hand, a service is provided for a UE through the PLMN except the HPLMN/EHPLMN, the UE is in the roaming state, and the PLMN is called Visited PLMN (VPLMN).

When the power of the UE is turned on at an initial stage, the UE retrieves the public land mobile network (PLMN) and selects an appropriate PLMN capable of receiving the service. The PLMN is a network that is deployed or operated by a mobile network operator. Each mobile network operator operates one or more PLMNs. Each of the PLMNs may be identified by a mobile country code (MCC) and a mobile network code (MNC). The PLMN information of the cell is included in the system information and broadcasted. The UE attempts to register the selected PLMN. When the registration is succeeded, the selected PLMN becomes a registered PLMN (RPLMN). The network may signal a PLMN list to the UE and the PLMNs included in the PLMN list may be considered as the PLMN such as the RPLMN. The UE registered in the network needs to be reachable by the network. When the UE is in the ECM-CONNECTED state (similarly, the RRC connection state), the network recognizes that the UE receives the service. However, when the UE is in the ECM-IDLE state (similarly, the RRC idle state), a situation of the UE is not effective in the eNB, but the situation is stored in the MME. In this case, the position of the UE which is in the ECM-IDLE state is known to only the MME as granularity of a list of tracking areas (TAs). A single TA is identified by a tracking area identity configured by the PLMN identity to which the TA belongs and the tracking area code (TAC) uniquely expressing the TA in the PLMN.

Subsequently, the UE selects a cell having signal quality and feature to receive an appropriate service among cells provided by the selected PLMN.

Next, the procedure of a UE selecting a cell will be described in detail.

When power is turned on or being remained in a cell, the UE performs the procedures to be serviced by selecting/reselecting a cell of adequate quality.

The UE in the RRC idle state should select the cell of adequate quality always and be ready for being serviced through the cell. For example, the UE which is just turned on should select a cell of adequate quality in order to register a network. When the UE in the RRC connection state enters the RRC idle state, the UE should select the cell which is going to remain in the RRC idle state. As such, the procedure of selecting a cell satisfying a certain condition in order for the UE to remain in the service standby state such as the RRC idle state is called the Cell Selection. It is an important point to select the cell as quick as possible, since the cell selection is performed in the state that the cell where the UE remains in the RRC idle state is not yet determined. Accordingly, if the cell provides a high level of wireless signal quality, the cell can be selected in the procedure of cell selection although the cell is not a cell that provides the best wireless signal quality.

Now, with reference to 3GPP TS 36.304 V8.5.0 (2009-03) "User Equipment (UE) procedures in idle mode (Release 8)", the method and procedure that a UE select a cell in 3GPP LTE will be described.

The cell selection process is generally divided into two ways.

First, as an initial cell selection process, the UE has no advance information on the radio channel during this process. Therefore, the UE retrieves all radio channels in order to find the appropriate cell. The UE finds the strongest cell in each channel. Thereafter, the UE selects the corresponding cell only at the time of finding the suitable cell that satisfies the cell selection criterion.

Next, the UE may select the cell by using stored information or using information broadcasted in the cell. Therefore, the cell selection may be rapidly performed as compared with the initial cell selection process. When the UE only finds the cell that satisfies the cell selection criterion, the UE selects the corresponding cell. When the UE does not find the suitable cell that satisfies the cell selection criterion through such a process, the UE performs the initial cell selection process.

After the UE selects a predetermined cell through the cell selection process, the strength or quality of the signal between the UE and the base station may be changed due to the mobility of the UE or a change of a wireless environment. Therefore, when the quality of the selected cell deteriorates, the UE may select other cell that provides higher quality. When the cell is again selected as such, a cell that provides higher signal quality than the currently selected cell is generally selected. The process is referred to as the cell reselection. The cell reselection process generally has a basic object to select the cell having the highest quality to the UE.

In addition to the quality of the radio signal, the network decides a priority for each frequency to notify the priority to the UE. The UE that receives the priority preferentially considers the priority to a radio signal quality criterion during the cell reselection process.

There may be a method for selecting or reselecting the cell according to the signal feature of the wireless environment and there may be a cell reselection method described below according to the features of the RAT and the frequency of the cell.

Intra-frequency cell reselection: The UE reselects a cell having the same RAT and the same center-frequency as a cell which is being camping.

Inter-frequency cell reselection: The UE reselects a cell having the same RAT and a different center-frequency as the cell which is being camping.

Inter-RAT cell reselection: The UE reselect a cell using an RAT different from an RAT which is being camping.

A principle of the cell reselection process will be described below.

First, the UE measures the qualities of the serving cell and the neighboring cell for the cell reselection.

Second, the reselection is performed based on the cell reselection criterion. The cell reselection criterion has features described below in association with the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called a best ranked cell. The cell index value is based on a value which the UE measures for the corresponding cell and is applied with a frequency offset or a cell offset as necessary.

The inter-frequency cell reselection is based on a frequency priority provided by the network. The UE attempts to camp on a frequency having the highest frequency priority. The network may provide the frequency priority to which UEs in cell will commonly apply through broadcast signaling or provide a frequency-dedicated priority for each UE through UE-dedicated signaling. The cell reselection priority provided through the broadcast signaling may be called the common priority, and the cell reselection priority setup by the network for each UE may be called the dedicated priority. When the UE receives the dedicated priority, the UE may receive the relevant validity time together with the dedicated priority. When the UE receives the dedicated priority, the UE starts the validity timer which is setup as the relevant validity time. The UE applies the dedicated priority in the RRC idle mode while the validity timer is operating. If the validity timer is terminated, the UE discards the dedicated priority and applies the common priority again.

The network may provide a parameter (e.g., a frequency-specific offset) used for the cell reselection to the UE for the inter-frequency cell reselection for each frequency.

The network may provide a neighboring cell list (NCL) used for the cell reselection to the UE for the intra-frequency cell reselection or the inter-frequency cell reselection. The NCL includes a cell-specific parameter (e.g., cell-specific offset) used in the cell reselection.

The network may provide a cell reselection black list used for the cell reselection to the UE for the intra-frequency cell reselection or the inter-frequency cell reselection. The UE does not perform the cell reselection for a cell included in the black list.

Subsequently, the ranking performed during the cell reselection evaluating process will be described.

A ranking criterion used for giving the priority of the cell is defined as illustrated in Equation 1.

$$R_S = Q_{meas,s} + Q_{hyst}, R_n = Q_{meas,n} - Q_{offset}$$

Herein, $R_s$ represents a ranking criterion of the serving cell, $R_n$ represents a ranking criterion of the neighboring cell, $Q_{meas,s}$ represents a quality value which the UE measures for the serving cell, $Q_{meas,n}$ represents a quality value which the UE measures for a neighboring cell, $Q_{hyst}$ represents a hysteresis value for the ranking, and $Q_{offset}$ represents an offset between two cells.

In an intra-frequency, when the UE receives an offset $Q_{offsets,n}$ between the serving cell and the neighboring cell, $Q_{ffoset} = Q_{offsets,n}$ and when the UE does not receive $Q_{offsets,n}$, $Q_{offset} = 0$.

In an inter-frequency, when the UE receives the offset $Q_{offsets,n}$ for the corresponding cell, $Q_{offset} = Q_{offsets,n} + Q_{frequency}$ and when the UE does not receive $Q_{offsets,n}$, $Q_{offset} = Q_{frequency}$.

When the ranking varies while the ranking criterion Rs of the serving cell and the ranking criterion of the neighboring cell $R_5$ are similar to each other, the ranking is frequently reversed, and as a result, the UE may alternatively reselect both cells. $Q_{hyst}$ represents a parameter for preventing the UE from alternatively reselecting both cells by giving hysteresis in cell reselection.

The UE measures the $R_s$ of the serving cell and the $R_n$ of the neighboring cell according to the above equation and regards a cell having the largest ranking criterion value as the best ranked cell and reselects this cell.

According to the criterion, it can be seen that the quality of the cell acts as the most important criterion in the cell reselection. If the reselected cell is not the suitable cell, the UE excludes the corresponding frequency or the corresponding cell from a cell reselection target.

Hereinafter, a radio link monitoring (RLM) will be described.

A UE monitors DL quality based on the cell-specific reference signal in order to detect the DL wireless link quality of the PCell. The UE estimates DL wireless link quality for monitoring the DL wireless link quality of the PCell and compares it with the threshold values Qout and Qin. The threshold value Qout is defined with the level in which the DL wireless link cannot be stably received, and it corresponds to 10% block error rate of hypothetical PDCCH transmission considering the PDFICH error rate. The threshold value Qin is defined with the level in which the DL wireless link can be stably received, better than the level of the Qout, and it corresponds to 2% block error rate of hypothetical PDCCH transmission considering the PCFICH error rate.

Hereinafter, a radio link failure (RLF) will be described.

The UE performs continuously performs measurement for the quality of a radio link with the serving cell that receives the service. The UE decides whether communication is impossible under a current situation due to deterioration in quality of the radio link with the serving cell. When the communication is almost impossible due to too low quality of the serving cell, the UE decides the current situation as a wireless connection failure.

When a radio link failure is decided, the UE abandons maintaining communication with a current serving cell, selects a new cell through the cell selection (alternatively, cell reselection) procedure, and attempts RRC connection re-establishment to a new cell.

In the specification of 3GPP LTE, the cases which are not able to do the normal communication are exemplified as follows.

The case that the UE determines that there is a serious problem in the downlink communication link quality based on the radio quality measurement result of the physical layer of the UE (The case of determining that the quality of the PCell is low during performing the RLM).

The case that the UE determines that there is a problem in the uplink transmission since the random access process continuously fails on the MAC sub layer.

The case that the UE determines that there is a problem in the uplink transmission since the uplink data transmission continuously fails on the RLC sub layer.

The case that the UE determines that the handover fails.

The case that the message received by the UE does not pass the integrity check.

Hereinafter, the process of the RRC connection re-establishment will be described in more detail.

Figure 7:
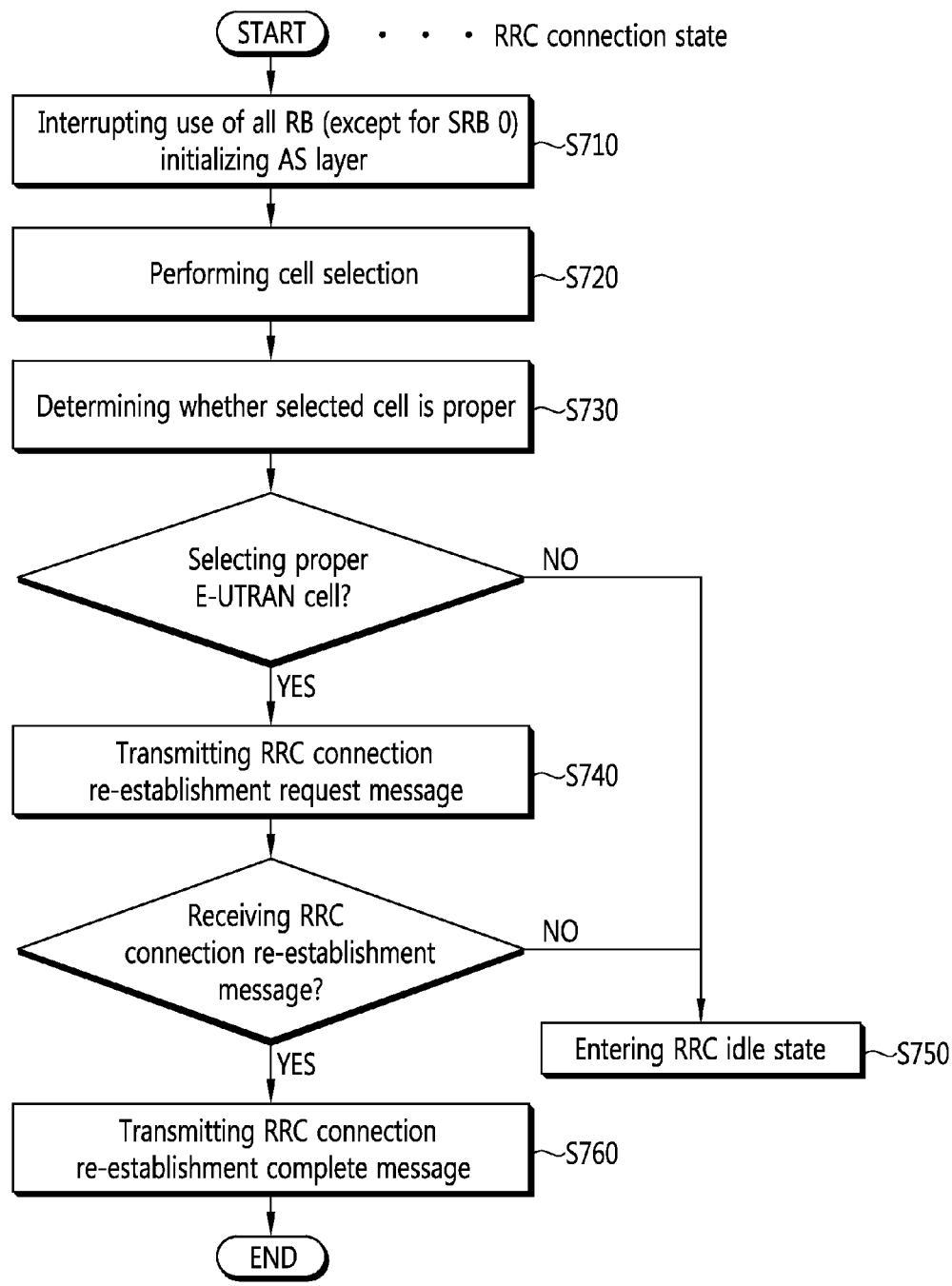
FIG. 7 is a drawing illustrating the procedure of the RRC connection re-establishment.

FIG. 7 is a drawing illustrating the procedure of the RRC connection re-establishment.

Referring to FIG. 7, the UE interrupts the use of all radio bearers which was configured except for the Signaling Radio Bearer #0, and initializes all sorts of sub layers of access stratum (AS). In addition, each sub layer and physical layer is configured as default configuration. During this process, the UE maintains the RRC connection state.

The UE performs the cell selection process for performing the RRC connection re-establishment process (step, S720). Although the UE maintains the RRC connection state, the cell selection process may be performed identically to the cell selection process that the UE performs in the RRC idle state.

The UE determines whether the corresponding cell is proper by verifying the system information of the corresponding cell after performing the cell selection process (step, S730). If it is determined that the selected cell is a proper E-UTRAN cell, the UE transmits the RRC connection re-establishment message to the corresponding cell (step, S740).

Meanwhile, if the cell selected through the cell selection process for performing the RRC connection re-establishment process is determined to be the cell that uses different RAT except the E-UTRAN, the RRC connection re-establishment process is interrupted, and the UE enters the RRC idle state (step, S750).

The UE may be implemented to complete the verification of the suitability of the cell within a limited time through the cell selection process and receiving the system information of the selected cell. For this, the UE may drive a timer in accordance with the start of the RRC connection re-establishment process. The timer may be interrupted if it is determined that the UE selects a proper cell. When the timer is terminated, the UE may enter the RRC idle state by regarding the RRC connection re-establishment as failed. The timer will be referred to as the radio link failure timer below. In the LTE specification TS 36.331, the timer whose name is T311 may be utilized as the radio link failure timer. The UE may acquire the setting value of the timer from the system information of the serving cell.

When receiving the RRC connection re-establishment request message from the UE and accepting the request, the cell transmits the RRC connection re-establishment message to the UE.

The UE that receives the RRC connection re-establishment message from the cell reconfigures the PDCP sub layer for SRB1 and the RLC sub layer. In addition, the UE recalculates all sorts of key values related to the security setting and reconfigures the PDCP sub layer that is in charge of the security as newly calculated security key values. Through this, SRB1 is open between the UE and the cell and the RRC control message may be exchanged. The UE completes the start of SRB1, and transmits the RRC connection re-establishment complete message which is that the RRC connection re-establishment process is completed to the cell.

Meanwhile, if the cell receives the RRC connection re-establishment request message and does not accept the request, the cell transmits a RRC connection reestablishment reject message to the UE.

When the RRC connection re-establishment process is successfully performed, the cell and the UE perform the RRC connection reconfiguration process. Through this, the UE recovers the state prior to performing the RRC connection re-establishment process, and guarantees the continuity of the service as much as possible.

Subsequently, the tracking collection entity (TCE) will be described.

The subscriber and equipment trace provide very detailed information on the call level with respect to one or more of specific mobiles. The data may be an additional source as the information for the performance measurement, and more intensified monitoring and optimized operation should be permitted. Unlike the performance measurement that always becomes the source of the information, the trace may be activated in response to the request/necessity of a user during a limited time interval for a specific object for analysis. The trace takes very important role in the operations such as determining the substantial cause of the mobile malfunction, the improved repairing, the resource use and optimization of quality, the radio frequency coverage control, the capacity improvement, the analysis for disconnection during a call, the core network and verifying UTMS process between both ends of the UTRAN.

The function of logging the data on the interface in the call level for a specific user (e.g. international mobile subscriber identity (IMSI)), mobile types (e.g. international mobile equipment identity (IMEI)), IMEI and Software Version (IMEISV) or the service initiated by a user is to acquire the information which cannot be deducted by the performance measurement such as the QoS identification of final user during call (e.g., requested QoS vs. provided QoS), protocol messages and the correlation between RF measurements or the information process interoperability among specific mobile benders. The trace data is collected on the TCE.

Hereinafter, a Minimization Drive Test (MDT) will be described.

An MDT enables UE to perform measurement and report the result thereof instead of a drive test in which conventional service providers measure the quality of cells using vehicles for cell coverage optimization. Coverage varies depending on the location of a BS, the deployment of peripheral buildings, and the using environment of a user. Accordingly, a service provider needs to periodically perform a drive test, which consumes lots of costs and resources. In order to overcome the disadvantages, the MDT is proposed that a service provider measures coverage using UE.

A service provider may write a coverage map which indicates whether or not the service is possible over the entire area where the service provider offers the service and indicates the distribution of the service quality by synthesizing the value of the MDT measurement received from the UE, and utilize the written coverage map in the network operations and optimization. For example, when a coverage problem on a specific area is reported from UE, a service provider may enlarge the coverage of the corresponding area cell by increasing the transmission power of the BS that provides service to the corresponding area. The time and cost required for network optimization can be minimized through such a method.

The MDT has been made based on the framework of a tracking function, that is, one of the tools of an operator for Operation, Administration, and Maintenance (OAM). The tracking function provides an operator with the ability to perform tracking and to log the behaviors of UE and thus can enable the operator to determine the major cause of a function failure on the UE side. Traced data is collected on a network, which is called a Trace Collection Entity (TCE). An operator uses the data collected in the TCE for analysis and evaluation. A tracking function used for the MDT includes signaling based on a tracking function and management based on tracking function. While signaling based on a tracking function is used to activate the MDT task toward a specific UE, the management based on the tracking function is used to activate the MDT task without being limited to a specific UE.

The MDT may be divided into two types: a logged MDT and an immediate MDT depending on whether the UE reports measured and stored log data in non-real time or in real time. The logged MDT is a method of the UE performing the MDT measurement first, logging the corresponding data, and then sending the logged data to a network. On the other hand, the immediate MDT is a method of the UE performing the MDT measurement and immediately sending the corresponding data to a network. In accordance with the logged MDT, the UE performs MDT measurement in the RRC idle state, but in accordance with the immediate MDT, the UE performs the MDT measurement in the RRC connected state.

Figure 8:
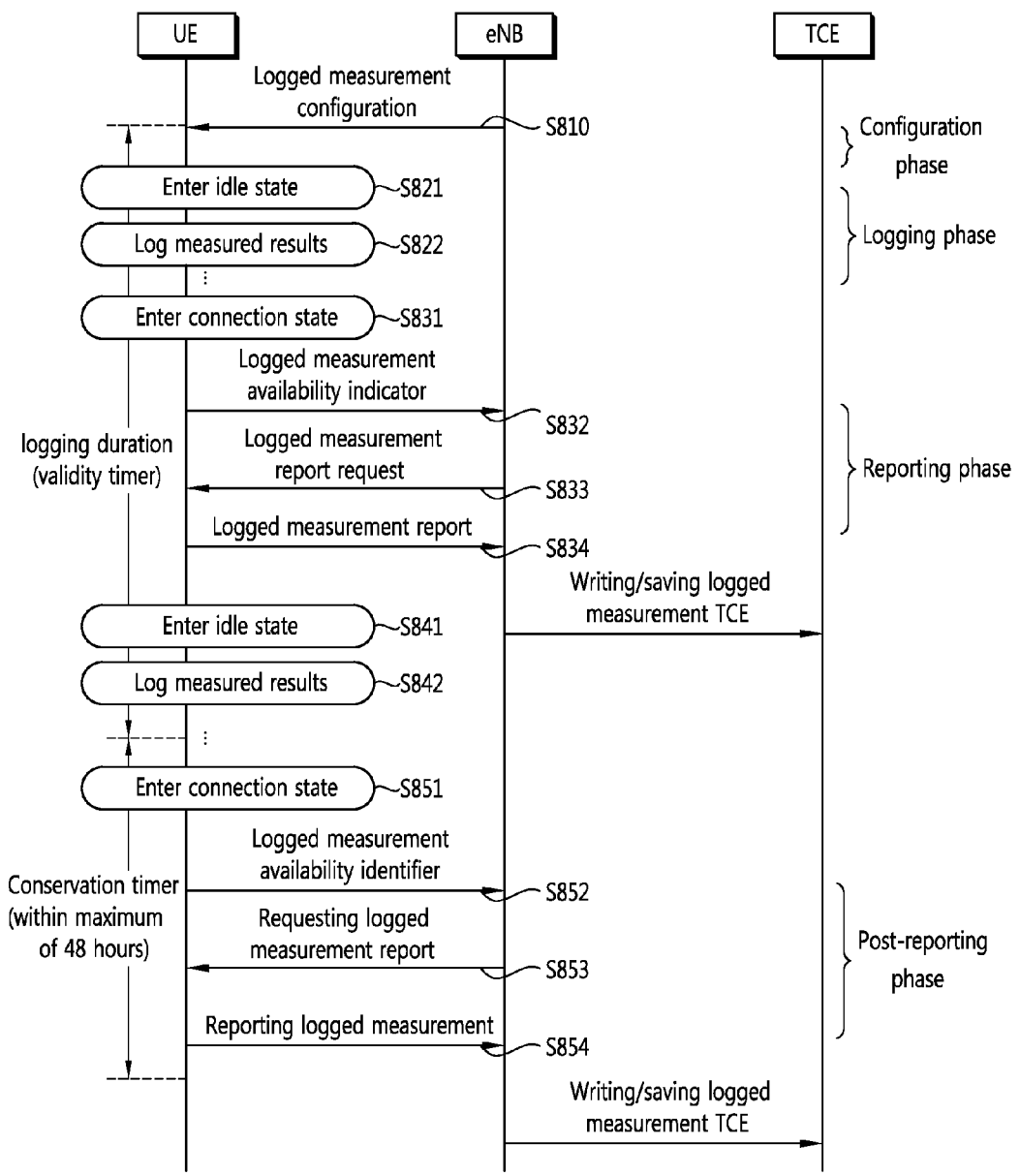
FIG. 8 is a flowchart illustrating a method of performing a logged MDT.

FIG. 8 is a flowchart illustrating a method of performing a logged MDT.

Referring to FIG. 8, the UE receives a logged measurement configuration (step, S810). The logged measurement configuration may be included in an RRC message and transmitted through a downlink control channel. The logged measurement configuration may include at least one of a TCE ID, the information about the reference time that is a basis for logging, the logging duration, the logging interval, and the information about the area configuration. The logging interval indicates an interval at which the measurement result is stored. The logging duration indicates the duration time for which the UE performs the logged MDT. The reference time indicates a reference time for the duration time for which the logged MDT is performed. The area configuration indicates an area that is requested to be logged by the UE.

Meanwhile, the UE initiates a validity timer when a logged measurement configuration is received. The validity timer means the lifetime of the logged measurement configuration, which may be specified by the information about the logging duration. The duration time of the validity timer may indicate the validity of measurement results owned by UE as well as the valid lifetime of the logged measurement configuration.

A procedure that the UE performs the logged measurement configuration and the corresponding overall procedure is performed as described above is called a configuration phase.

When the UE enters the RRC idle state (step, S821), the UE logs the measurement result while the validity timer is driven (step, S822). The measurement result value may include RSRP, RSRQ, Received Signal Code Power (RSCP), Ec/No, and the like. The information that the measurement result is logged is called a logged measurement and/or a log of the measurement result. The time interval at which the UE logs the measurement result one or more times is called a logging phase.

What the UE executes the logged MDT based on the measurement configuration may vary depending on the location of the UE.

Figure 9:
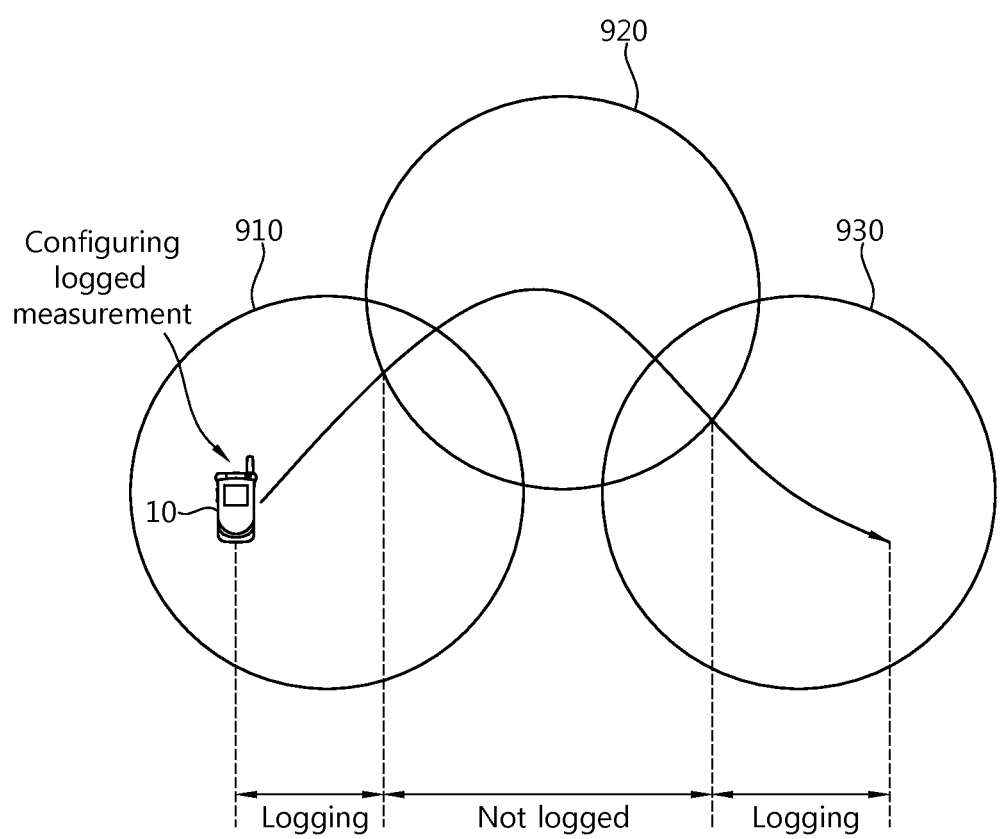
FIG. 9 is a drawing illustrating an example of the logged MDT according to the logging area.

FIG. 9 is a drawing illustrating an example of the logged MDT according to the logging area.

A network may configure the logging area that is the area in which the UE is to log. The logging area may be represented as a cell list or a tracking area/location area list. If a logging area is configured in the UE, the UE stops logging when the UE gets out of the logging area.

Referring to FIG. 9, a first area 910 and a third area 930 are areas configured as logging areas, and a second area 920 is an area in which logging is not permitted. The UE performs logging in the first area 910, but does not perform logging in the second area 920. The UE performs logging again when the UE moves from the second area 920 to the third area 930.

Figure 10:
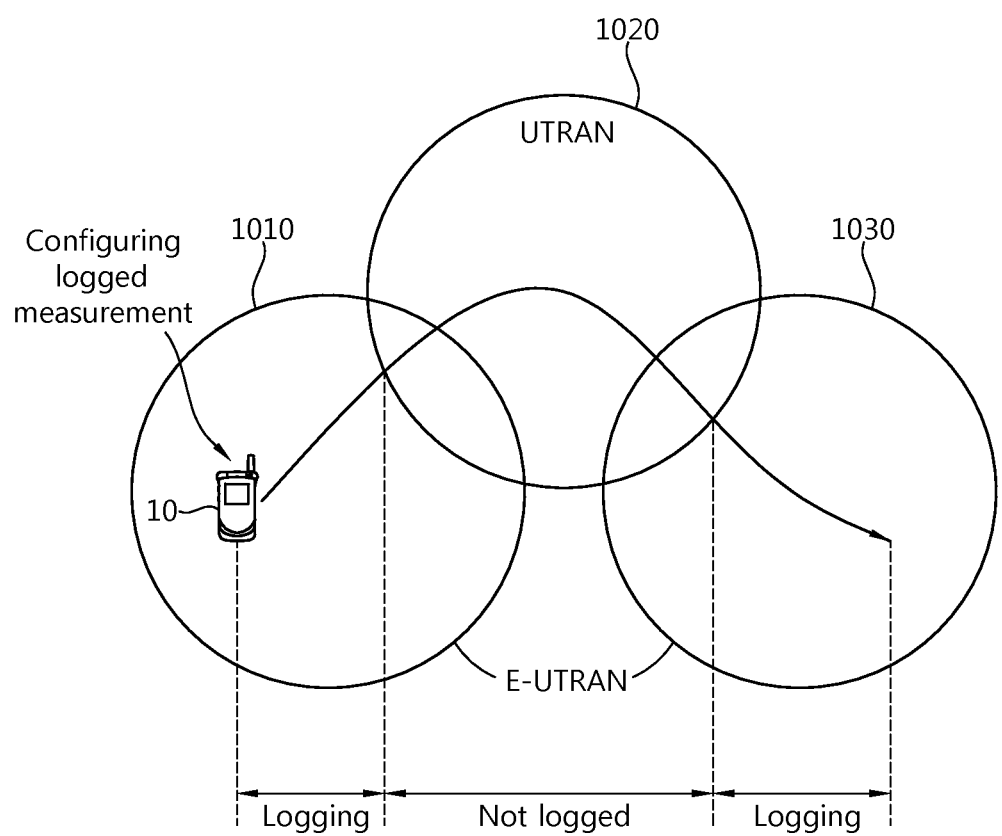
FIG. 10 is a drawing illustrating an example of the logged MDT according to the change of the RAT.

FIG. 10 is a drawing illustrating an example of the logged MDT according to the change of the RAT.

The UE performs logging only when the UE camps on the RAT from which the logged measurement configuration has been received and suspends logging in other RATs. However, the UE may the log cell information for other RATs in addition to camp-on RAT.

A first area 1010 and a third area 1030 are E-UTRAN areas, and a second area 1020 is a UTRAN area. The logged measurement configuration is received from the E-UTRAN. When the UE enters the second area 1020, the UE does not perform the MDT measurement.

Referring back to FIG. 8, the UE enters the RRC connected state (step, S831). If there is a logged measurement to be reported, the UE informs an eNB that the logged measurement to be reported is present (step, S832). The UE may inform the eNB that the logged measurement is present when an RRC connection is established, an RRC connection is reestablished, or an RRC connection is reconfigured. In addition, if the UE performs the handover, the UE may inform a handover target cell of the presence of the logged measurement. What the UE informs that the logged measurement s present to the eNB may be to transmit including a logged measurement-available indicator, that is, the indication information informing that the logged measurement is present, in an RRC message transmitted from the UE to the eNB. The RRC message may be an RRC connection configuration complete message, an RRC connection reestablishment complete message, an RRC reconfiguration complete message, or a handover complete message.

When the eNB receives a signal informing that the logged measurement is present from the UE, the eNB requests the UE to report the logged measurement (step, S833). Requesting the report on the logged measurement may be to transmit including the logged measurement report request parameter regarding the information indicating the request in an RRC message. The RRC message may be the UE information request message.

When the UE receives the request to report the logged measurement from the eNB, the UE reports the logged measurement to the eNB (step, S834). Reporting the logged measurement to the eNB may be to transmit including the logged measurement report including pieces of logged measurement in an RRC message to the eNB. The RRC message may be the UE information report message. In reporting the logged measurement, the UE may report all or some of logged measurement owned by the UE at the time of reporting to the eNB. If the UE reports some of logged measurements, the part of logged measurement reported may be discarded.

A phase of a process in which the UE informs the eNB that the logged measurement is present, receives a request to report from the eNB, and reports the logged measurement according to the request as described above is called a report phase.

What the UE measures while the logged MDT is performed is mainly about the wireless environment. The MDT measurement may include a cell identity and the signal quality and/or signal intensity of the cell. The MDT measurement may include the measurement time and place. The following table exemplifies the contents logged by UE.

TABLE 1

| Parameter (set) | Description |
| --- | --- |
| Serving cell identifier | Global cell Identity of Serving cell |
| Measurement results of serving cell | Reference Signal Received Power (RSRP) measured RSRQ of serving cell |
| | Reference Signal Received Quality (RSRQ) measured RSRQ of serving cell |
| Measurement results of neighbor cell | Cell Identities of measured E-UTRA cells, Measured result of E-UTRA cells |
| | Cell Identities of measured UTRA cells, Measured result of UTRA cells |
| | Cell Identities of measured GERAN cells, Measured result of GERAN cells |
| | Cell Identities of measured CDMA 2000 cells, Measured result of CDMA 2000 cells |
| Time stamp | The moment of logging measurement results, calculated as {current time minus absoluteTimeStamp} in seconds |
| Location information | Detailed location information at the moment of logging |

The information logged at different logging times can be saved to be classified as different log entries.

Figure 11:
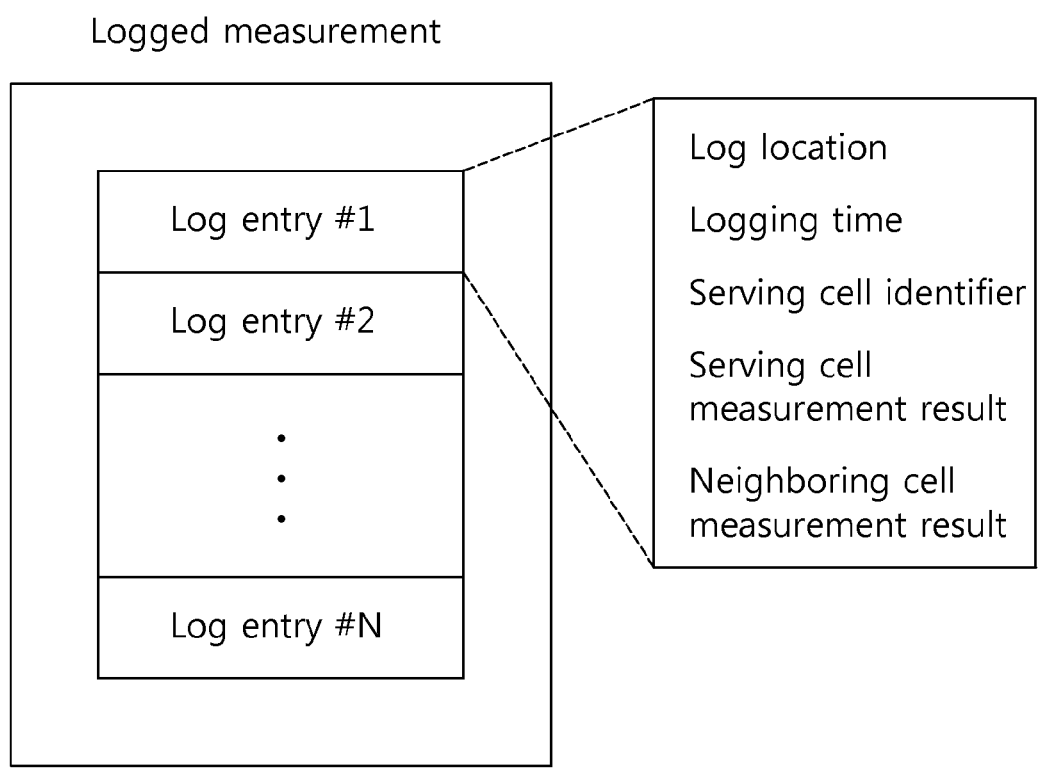
FIG. 11 is a diagram showing an example of the logged measurement.

FIG. 11 is a diagram showing an example of the logged measurement.

The logged measurement includes one or more log entries.

The log entry includes a logging location, a logging time, a serving cell identity, a serving cell measurement result, and a neighboring cell measurement result.

The logging location indicates the location where the UE performs measurement.

The logging time indicates the time when the UE performs measurement. The information logged at different logging times is stored in different log entries.

The serving cell identity may include a cell identity in the layer 3, which is called a Global Cell Identity (GCI). The GCI is a set of a Physical Cell Identity (PCI) and a PLMN identity.

Meanwhile, the UE may perform logging by analyzing the criteria related to the performance of the UE in addition to the wireless environment. For example, the criteria related to the performance of UE may include a throughput, an erroneous transmission/reception rate, etc.

Referring back to FIG. 8, the aforementioned logging phase and report phase may be present in plural times for the logging duration (steps, S841 and S842).

The eNB may record/store the logged measurement on/in a TCE when the logged measurement is reported.

If the UE has the logged measurement that has not been reported after the validity timer expires, that is, after the logging duration elapses, the UE performs a procedure for reporting the logged measurement to the eNB. A phase in which the overall procedure is performed for this is called a post-reporting phase.

When the logging duration expires, the UE discards the logged measurement configuration and initiates a conservation timer. After the logging duration is terminated, the UE stops the MDT measurement. However, the measurement logged already remains intact without being discarded. The conservation timer indicates the lifetime of the remaining logged measurement.

When the UE enters the RRC connected state (step, S851) before the conservation timer expires, the UE may report the logged measurement which hasn't been reported to the eNB. In this case, the procedure for the logged measurement report aforementioned may be performed (steps, S852, S853 and S854). When the conservation timer expires, the remaining logged measurement may be discarded. When the logged measurement is reported, the eNB may record/store the logged measurement on/in the TCE.

The conservation timer may be fixed to a predetermined value in the UE and may be previously set in the UE. For example, the value of the conservation timer may be 48 hours. Or, the value of the conservation timer may be included in the logged measurement configuration and transferred to the UE or may be included in a different RRC message and transferred to the UE.

Meanwhile, when a new logged measurement configuration is transferred to the UE, the UE may update the existing logged measurement configuration into the newly obtained logged measurement configuration. In this case, the validity timer can be started again from the time when the logged measurement configuration is newly received. In addition, the logged measurement based on the previous logged measurement configuration may be discarded.

Figure 12:
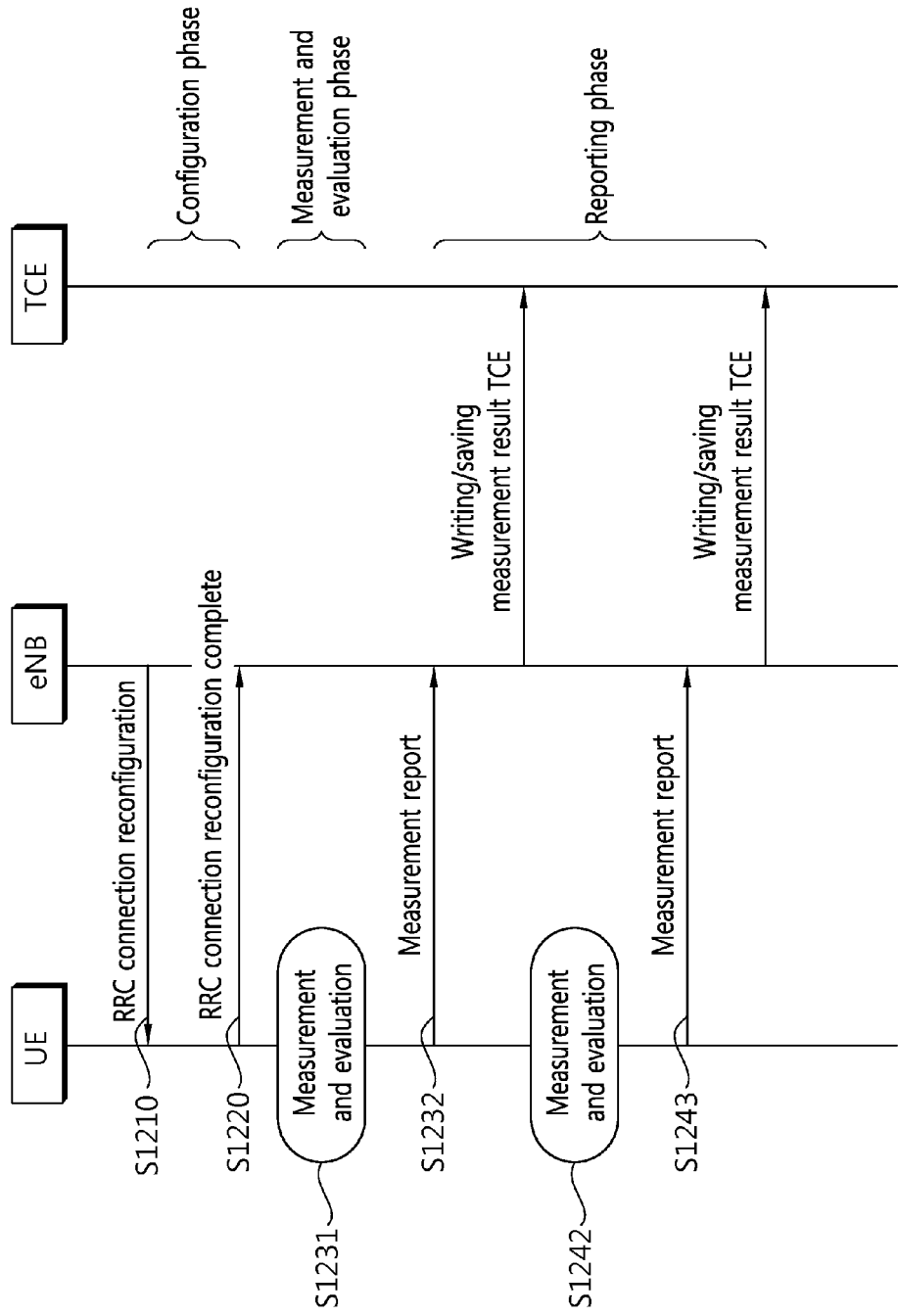
FIG. 12 is a diagram showing an example of an immediate MDT.

FIG. 12 is a diagram showing an example of an immediate MDT. The immediate MDT is based on a radio resource management (RRM) measurement and the report mechanism. In addition, the information related to the location upon the measurement report is added and reported to the eNB.

Referring to FIG. 12, the UE receives an RRC connection reconfiguration message (step, S1210) and transmits an RRC connection reconfiguration complete message (step, S1220). Through this, the UE enters the RRC connected state. The UE may receive the measurement configuration by receiving the RRC connection reconfiguration message. In the example of FIG. 12, the measurement configuration has been illustrated as being received through the RRC connection reconfiguration message, but the measurement configuration may be included in a different RRC message and transmitted.

The UE performs measurement and evaluation in the RRC connected state (step, S1231) and reports the measurement result to the eNB (step, S1232). In the immediate MDT, the measurement result may provide the precise location information, as possible, as in the example of the location information provided by the Global Navigation Satellite System (GNSS). For the location measurement, such as an RF fingerprint, the measurement result may provide the measurement information about a neighboring cell, which may be used to determine the location of the UE.

From FIG. 12, it may be seen that even after the executed measurement and evaluation (step, S1231) and the report (step, S1232), the UE reports the measurement result (step, S1243) to the eNB right after performing measurement and evaluation (step, S1242). This is the biggest difference between the logged MDT and the immediate MDT.

Next, the description related to RLF reporting will be followed.

In order to support the mobility robustness optimization (MRO) of network, when the RLF occurs or the handover failure occurs, the UE reports such failure event to the network.

After the RRC connection re-established, the UE may provide the RLF report to the eNB. The radio measurement included in the RLF report may be used for identifying the coverage problems as a potential reason of failure. The information may exclude such events in the MRO evaluation for the intra-LTE mobility connection failure, and may use the events for the input of other algorithms.

When the RRC connection re-establishment is failed or the UE is unable to perform the RRC connection re-establishment, the UE reconnects in the idle mode, and then may generate the effective RLF report for the eNB. For this purpose, the UE may save the latest RLF or the information related to the handover failure, and may indicate the LTE cell that the RLF report is valid at every RRC connection (re)establishment and the handover until the RLF report is loaded by the network or for 48 hours after the RLF or handover failure is detected.

The UE maintains the information for the state shift and change of the RAT, and indicates again that the RLF report is valid after going back to the LTE RAT.

The validity of the RLF report in the RRC connection configuration procedure is that the UE undergoes the disturbance such as a connection failure and indicates that the RLF report hasn't been yet transferred to the network due to the failure. The RLF report from the UE includes the following information:

The last cell that has provided service to the UE (in case of the RLF) or the E-CGI of the target of handover. If the E-CGI is not known, the PCI and the frequency information are used instead of it.

The E-CGI of the cell that tried the re-establishment.

The E-CGI of the cell that provides service to the UE when the last handover is initialized, for example, when the message 7 (the RRC connection reconfiguration) is received by the UE.

The time lapsed from the last handover initialization to the connection failure.

The information indicating whether the connection failure is due to the RLF or the handover failure.

The radio measurements.

The location of failure.

The eNB that receives the RLF failure from the UE may forward the report to the eNB that has provided service to the UE before the connection failure reported. The radio measurements included in the RLF report may be used for identifying the coverage issues which are the potential causes of the radio link failure. The information may exclude the events from the MRO evaluation of the intra-LTE mobility connection failure and may be used to resend them as the input for other algorithm. The RLF report may be considered as a part of the MDT.

The accessibility measurement will be described as follows.

There are many aspects to deal with the non-availability measurement of the connection for the UE, which deal with all of common channels and connection procedures. In order to inform the ineffectiveness of the connection to the network and to help the parameter optimization for increasing the connection validity according to this, the UE performs the accessibility measurement when the connection establishment is failed. In order to measure the accessibility, the UE perform the logging as follows.

An induced time stamp is included by using the relative timer that counts the time between the failure and the report. The saving time for the accessibility measurement is 48 hours.

It is supported to report the number of the transmitted random access preambles.

It is included to indicate whether it gets to the maximum power level.

It is included to indicate whether the contention is detected during the random access procedure for the connection establishment.

The accessibility measurement may be considered as a part of the MDT.

Subsequently, the positioning will be described.

The function of positioning provides the tool for determining the geographical location and/or the velocity of the UE based on the measurement of the radio signal. The location information may be requested by the client that is combined with the UE (e.g., an application) or the client that is in or in connection with the core network, and may be reported to the client. The location information is reported with a standard format, which may be implemented based on the cell or geographical coordinate together with the estimated error (uncertainty) of the location and velocity of the UE, and, if possible, with the locating method (or the list of the methods) which is used for acquiring location estimation of the location.

The most of the activated or non-activated UEs in the network may be able to use the location service (LCS) characteristics without compromising of the wireless transmission of the E-UTRAN or signaling capabilities.

The uncertainty of the location information depends on the method used, the location of the UE within the coverage region and the movement of the UE. The various design options of the E-UTRAN system (e.g., the size of cell, tunable antenna techniques, path loss estimation value, accuracy of timing and eNB surveys) make the network operator be provided with the proper and cost-effective UE positioning method for market.

There are various examples usable for the positioning information. The positioning functions may be internally used by the EPS, the value-added network services, the UE itself, or through the network, and by the third party service. Although the function may be essential or used by additional emergency service, the location service may not be exclusively allocated for the location service.

The positioning method which is supported in the E-UTRAN may include a network-assisted GNSS method, a downlink positioning method, an enhanced cell ID (E-CID) method and an uplink positioning method, and the hybrid positioning method to which one or more methods described above are simultaneously applied can be used.

The network-assisted GNSS method is based on the UE which is provided with the radio receiver that is able to receive GNSS signal. The GNSS includes a global positioning system (GPS), a Galileo, a global navigation satellite system (GLONASS), a space based augmentation systems (SBAS) and a quasi zenith satellite system (QZSS). According to the network-assisted GNSS method, each of different GNSSs may be individually used for determining the location of the UE, or at least one system may be used in combination.

The downlink positioning method, which is also called an observed time difference of arrival (OTDOA), is based on the timing measured for the downlink signals which is received by the UE from the multiple eNBs. The UE measures the timing of the received signal using the assistance data which is received from the positioning server. The measurement result is used for determining the location of the UE based on the neighboring eNBs.

In the cell ID (CID) positioning method, the location of the UE is estimated based on the serving eNB of the UE and the acknowledgement of the serving cell. The information of the serving eNB and serving cell may be acquired by paging, tracking area update or other methods. The E-CID positioning method means the technique that uses the measurement which is different from those of an additional UE and/or the E-UTRAN radio resource for improving the UE location estimation.

Although the E-CID positioning method utilizes a partially the same measurement as the measurement control system on the RRC protocol, the UE is not generally expected to perform an addition measurement only for positioning. For example, a separate measurement configuration or a measurement control message is not provided for positioning, and the UE reports the effective measurement owned rather than being required to perform an additional measurement action.

The uplink positioning method, which is also called an uplink time difference of arrival (UTDOA), is based on the measurement timing at the side of multiple location measurement unit (LMU) for the uplink signal which is transmitted from the UE. The LMU measures the signal receiving timing using the assistance data which is received from the positioning server.

Figure 13:
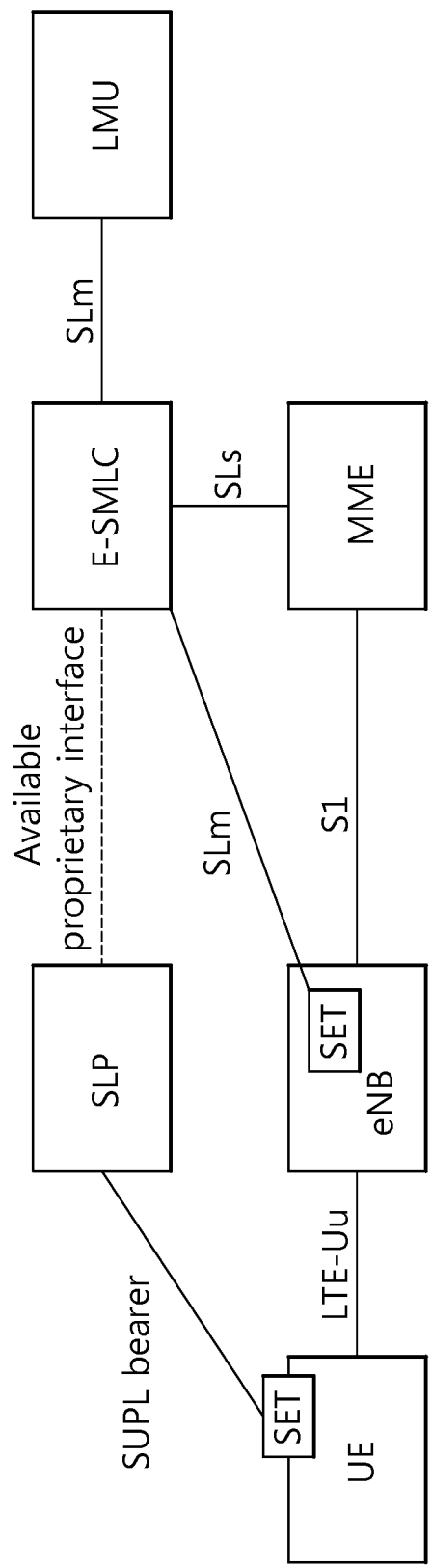
FIG. 13 is a drawing illustrating an example of the wireless communication system structure to which the positioning of the UE according to an embodiment of the present invention is applied.

FIG. 13 is a drawing illustrating an example of the wireless communication system structure to which the positioning of the UE according to an embodiment of the present invention is applied.

The MME may receive the request for the location service related to a specific target UE from a specific entity (e.g., the global mobile location center (GMLC) or UE). In addition, as an object such as the IP multimedia subsystem (IMS) emergency call from the UE, the MME may determine to start the location service for a specific target UE by itself. According to this, the MME transfers the location service request to the evolved-service mobile location center (E-SMLC).

The E-SMLC processes the location service request. The E-SMLC may forward the assistance data to the target UE in order to assist in the UE based and/or UE supported positioning. The E-SMLC may also perform the positioning of the object UE. In processing the location service according to the uplink method, the E-SMLC may forward the configuration data to the location measurement units (LMUs). According to this, the E-SMLC may return the result of the location service to the MME. Meanwhile, in case that the location service is requested by other entity (the UE or E-SMLC), not by the MME, the MME may return the result to the corresponding entity.

The SUPL location platform (SLP) is a secure user plane location (SUPL) entity that is in charge of user plane positioning.

In order to support the positioning of the target UE and the transmission of the position support data to the UE, the position related functions are provided, and the functions may be implemented by being properly distributed in the structure shown in FIG. 13. Meanwhile, the location service related operations that may be performed among the entities may refer to FIG. 14.

Figure 14:
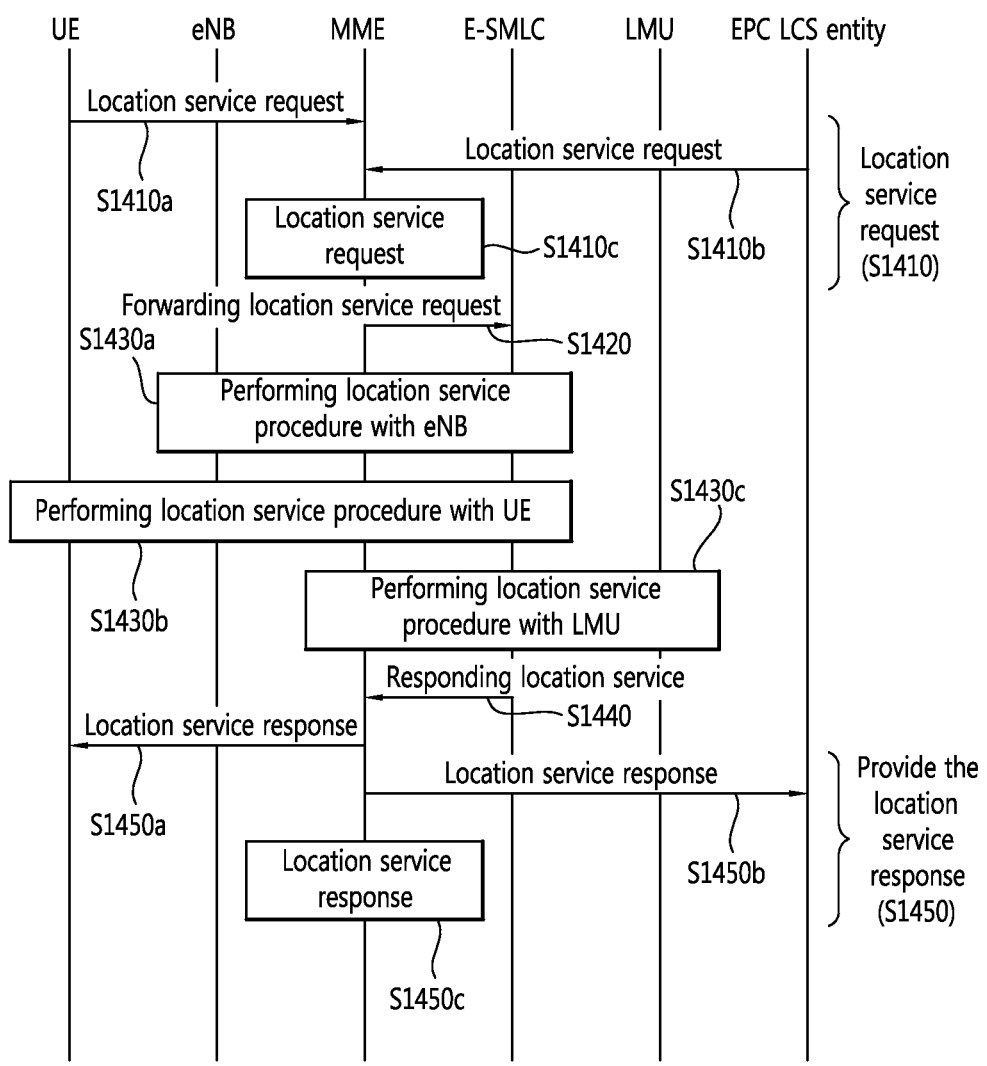
FIG. 14 is a drawing illustrating all procedures for the location service according to an embodiment of the present invention.

FIG. 14 is a drawing illustrating all procedures for the location service according to an embodiment of the present invention.

In case that the MME receives the location service request when the UE is in the ECM-IDLE state, the MME performs the network inducing service request for establishing signaling connection with the UE and allocating a specific eNB. The UE is assumed to enter the connection state before all of the procedures shown in FIG. 14 is started.

The location service is started by the location service request of a specific entity (step, S1410). The location service request may be started as described below.

The UE may request the location service (e.g., positioning or forwarding the support data) to the serving MME on the NAS level (step, S1410a). A specific entity such as the GMLC in the evolved packet core (EPC) may request the location service (e.g., positioning) for the target UE to the serving MME (step, S1410b). The serving MME for the object UE may determine whether the location service is necessary, if necessary, request the location service by itself (step, S1410c). This may be for positioning the UE on a specific location or emergency call.

The MME forwards the location service request to the E-SMLC (step, S1420).

The E-SMLC performs the location service procedure in response to the location service request (step, S1430). The E-SMLC may perform the location service procedure with the serving eNB of the UE (step, S1430a). This may include the positioning measurement or acquiring the support data. The E-SMLC may perform the location service procedure with the UE for downlink positioning with step, S1430a or instead of step, S1430a (step, 1430b). This may include acquiring the location estimation or the positioning measurement or forwarding the location support data to the UE. For the uplink positioning (e.g., the UTDOA), with step, S1430a, the E-SMLC may perform the location service procedure with one or more LMUs for the object UE (step, S1430c). This may include acquiring the positioning measurement.

The E-SMLC provides the location service response to the MME (step, S1440). In the location service response, the necessary results may be included. For example, indicator indicating success or failure and/or the location estimation for the UE may be included.

The location service response is provided to the entity that requests the location service (step, S1450). When the location service request is started from the UE as step, S1410a, the MME may forward the location service response to the UE (step, S1450a). In this case, the location service response may be requested with the location estimation of the UE or may include a necessary result. When the location service request is started by a specific entity in the EPC as step, S1410b, the MME may forward the location service response to the corresponding entity (step, S1450b). In this case, the location service response may be requested with the location estimation of the UE or may include a necessary result. When the MME starts the location service request by itself as step, S1410c, the location service response which is received from the E-SMLC may be used for the location service (step, S1450c).

Hereinafter, the positioning operation in a wireless communication system will be described.

Unlike the location service support for specific UEs, the E-SMLC may interact with elements in the E-UTRAN for acquiring the measurement information that supports one or more positioning methods for all UEs.

The support of downlink positioning method: The E-SMLC may acquire the location related information for supporting the downlink positioning method, and for this, may interact with the eNB that is accessible from the MME that is signally accessed with the E-SMLC. The information may include the timing information for the eNB which is related to the absolute GNSS time or the timing for other eNBs. In addition, the information may include the information for the cell which is supported, and as an example, the positioning reference signal (PRS) schedule may be included. The signaling access between the E-SMLC and the eNB may be performed through the MME that maintains the signaling access with the E-SMLC and the eNB.

The support of uplink positioning method: The E-SMLC may interact with the serving eNB of the UE for retrieving the target UE configuration information for supporting the uplink positioning method. The configuration information may include the information requested from the LMU for acquiring the uplink time measurement. The E-SMLC may indicate that it is needed to transmit the SRS signal to the UE for the uplink positioning to the serving eNB. If the requested resource is not available, the eNB may allocate a different resource and report the resource allocation to the E-SMLC. The E-SMLC may also let the LMU perform the uplink time measurement and request to report the result.

Hereinafter, the operation of entities related to the UE positioning in a wireless communication system will be described in detail.

The UE may transmit a required signal for the location measurement of the UE based on the uplink. In addition, the UE may measure the uplink signal from different resource like the E-UTRAN and other GNSS system. The measurement method may be determined based on the selected positioning method.

The UE may include the location service application or access to the location service application through the communication with the network or other application existed in the UE. The location service application may include the function of measurement and calculation requested for determining the location of the UE with the support of the requested network or without the support of the network.

For example, the UE may include an independent positioning function (e.g., GPS), and may report the result independently from the E-UTRAN transmission. The UE equipped with the independent positioning function may utilize the support information which is acquired from the network.

The eNB is an element of the E-UTRAN network that supports the measurement result for the location estimation, and may measure a radio signal for the target UE and transmit the measurement to the E-SMLC. If the measurement is performed in response for the request or a change on regular or a specific radio state occurs, the eNB may automatically perform the measurement and report. The eNB may be configured that the UE transmits the periodical SRS.

The E-SMLC manages the support of the location service for the target UE, which includes the positioning of the UE and forwarding of the supporting data to the UE. The E-SMLC may interact with the serving eNB of the UE for acquiring the location measurement for the UE. The measurement includes the uplink measurement by the eNB and the downlink measurement by the UE. Among this, the downlink measurement by the UE may be provided to the eNB through a different function such as the support of the handover. The E-SMLC may interact with the eNB for indicating to the serving eNB that it is needed that the UE transmits the SRS signal for making it possible to perform the unlink positioning method and for acquiring the target UE configuration data which is required to calculate the timing of the signal by the LMU. The E-SMLC may select the set of the LMU which is used for the UTDOA positioning. The E-SMLC may interact with the LMUs which are selected for requesting the timing measurement. The E-SMLC may interact with the target UE for forwarding the supported data and for acquiring the location estimation if requested.

For the positioning of the target UE, the E-SMLC may determine the positioning method which is to be used based on the factors including the LCS client type, the requested QoS, the positioning capacity value of the UE, the positioning capacity value of the eNB, and the like. According to this, the E-SMLC may apply the positioning method to the UE and/or the serving eNB. The positioning method includes the location estimation for the positioning method based on the UE and/or the location measurement for the positioning method based on the network. The E-SMLC may combine all received results, and determine the single location estimation for the target UE. The additional information such as accuracy and velocity of the location estimation may also be determined.

The LMU performs the measurement and forwards the measured result to the E-SMLC. All of the location measurement acquired by the LMU may be provided to the requested E-SMLC. The UE positioning request may involve the measurement by a plurality of LMUs.

The network acquires the measurement result and the location information from a UE and enables to optimize the network performance. As described above, the MDT may be introduced for such an object. In order to optimize the network performance effectively, it is important to provide accurate location information in relation to the measurement result acquired.

Meanwhile, the discrepancy may occur between the time of acquiring the measurement result by the UE and the time of acquiring the location information through the positioning. Such a phenomenon may occur because the UE does not always perform the positioning in order to save its battery consumption, and it may not be possible to acquire the relevant location information ahead of the time of reporting the relevant measurement result to the network. In case that the location information is acquired after the measurement result is reported to the network, the network performance optimization may not be effectively performed since the network cannot acquire the location information relevant to the measurement result. In addition, even though the relevant location information is reported to the network after the measurement result is reported to the network, the correlation between the measurement result and the location information may not be guaranteed in the aspect of network due to the speed of UE and/or the moving path of UE during the time difference.

The present invention suggests a method for reporting the information based on the location estimation to network in order to estimate the location information which is required for the network performance optimization, and a method for estimating the location information through this.

Figure 15:
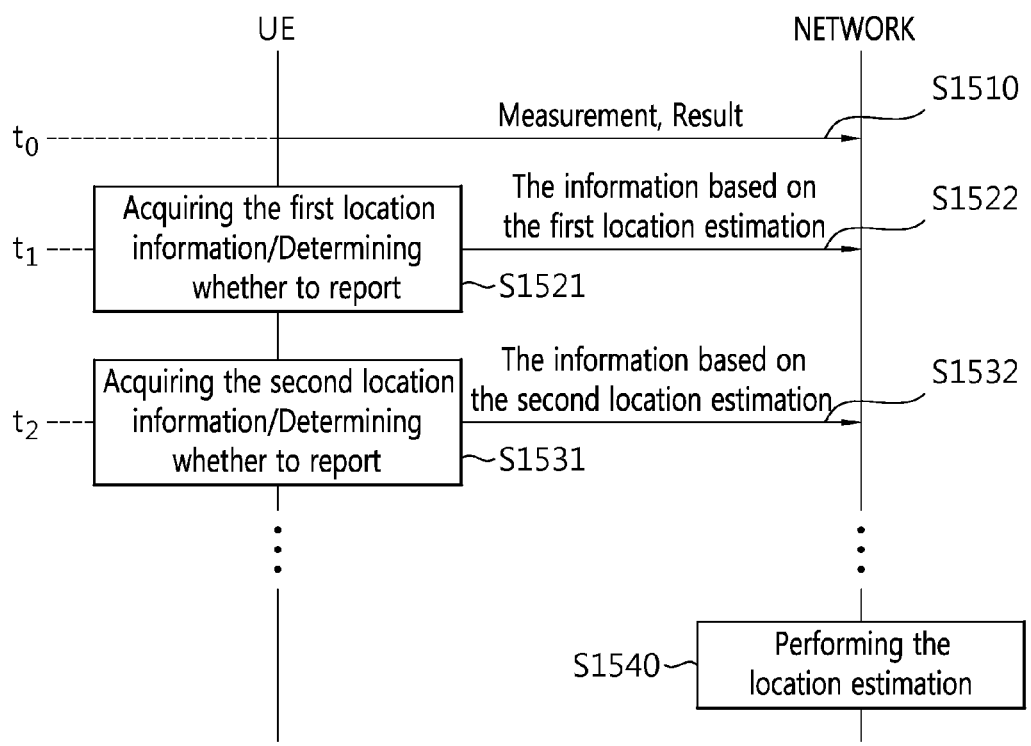
FIG. 15 is a drawing illustrating a method of the location estimation according to an embodiment of the present invention.

FIG. 15 is a drawing illustrating a method of the location estimation according to an embodiment of the present invention.

Referring to FIG. 15, a UE transmits the measurement result according to the measurement performed to network (S1510). The measurement result may depend on the measurement configuration configured by the network. The measurement result may depend on the MDT configuration configured by the network. In this example, the network may be configured to have the UE acquire the measurement result together with the relevant location information by performing the positioning when performing the measurement and report it.

If the condition of the measurement result to report is satisfied at $t_0$, the UE may report the measurement result to the network, but may not acquire the location information at $t_0$ relevant to the measurement result immediately. In this case, the UE may report only the measurement result without the location information at $t_0$. In this time, the UE may decide to report the information based on the location estimation to the network such that the location information relevant to the measurement result at $t_0$ can be estimated by the network. When the UE reporting the information based on the location estimation to the network, it may be initiated by the UE itself to report only the measurement result without the relevant location information to the network. When the UE reporting the information based on the location estimation to the network, it may be initiated by separate instruction of the network that receives only the measurement result without the location information. This will be discussed again below.

The UE acquires first location information, and decides whether to report it or not (S1521). The first location information may be the location information which is acquired through the positioning technique described above performed at a specific time $t_1$. Otherwise, the first location information may be the location information that indicates the actual geographic location of the UE at the specific time $t_1$, or the information for acquiring the actual geographic location of the UE. After acquiring the first location information, the UE may decide whether to report the first location information to the network or not. What is to decide whether to report the first location information may be to check if the first location information to be valid. Whether to report the first location information may be decided based on the interpolation parameter configured by the network. The interpolation parameter such as Tmax, Tmin, Dmax and Tmin may be configured, and each of the parameters may be used as follows.

Tmax: Indicating the maximum value which allows a time interval between the time of acquiring the measurement result or the time of acquiring the specific location information and the time of acquiring the next location information. If the time interval between the time of measurement result and the time of acquiring the first location information exceeds the Tmax value, the UE determines that the location information related to the measurement result cannot be estimated through the location information acquired, and may decide not to report the information based on the location information to the network. If the time interval between the time of acquiring the specific location information and the time of acquiring the next location information exceeds Tmax value, the UE may determine that the location information acquired is not valid information. In this case, the UE may decide not to report the location information.

Tmin: Indicating the minimum value which allows a time interval between the time of acquiring the measurement result or the time of acquiring the specific location information and the time of acquiring the next location information. The UE that transmits the information based on the location estimation to the network may acquire the location information through the positioning after at least Tmin has lapsed from the time of acquiring the measurement result. Accordingly, if the time interval between the time of measurement result and the time of acquiring the first location information is shorter than Tmin value, the location information acquired may be determined to be the location information related to the measurement result or not valid location information. The UE that acquires the location information at a specific time may acquire the next location information through the positioning after at least Tmin has lapsed.

Dmax: Indicating the maximum value which allows a distance section between the location of UE at the time of acquiring the measurement result or the location of UE at the time of acquiring the specific location information and the location of UE at the time of acquiring the next location information. If the distance section between the location of UE at the time of measurement result and the location of UE at the time of acquiring the first location information exceeds the Dmax value, the UE determines that the location information related to the measurement result cannot be estimated through the location information acquired. The distance section may be calculated by $(t_1-t_0)*v(t_0)$, herein $v(t_1)$ may be the speed at the time $t_1$. If the distance section between the location of UE at the time $t_1$ of acquiring the specific location information and the location of UE at the time $t_2$ of acquiring the next location information exceeds Dmax value, the UE may determine that the location information $L(t_2)$ acquired at the time $t_2$ is not valid information. In this case, the UE may decide not to report the location information.

Dmin: Indicating the minimum value which allows a distance section between the location of UE at the time of acquiring the specific location information and the location of UE at the time of acquiring the next location information. The UE that acquires the location of UE at the time of $t_2$ and the speed $v(t_2)$ of UE may determine that the location information acquired is the valid location information at $t_2$ if the distance section $v(t_2)*(t_2-t_1)$ moved by the UE during the time interval from $t_1$ to $t_2$ exceeds Dmin.

In the step, S1521, the time of acquiring the first location information is the first time of acquiring the location information after acquiring/reporting the measurement result. If the time interval between the time of $t_0$ and the time of $t_1$ is greater than Tmin and smaller than Tmax, the UE may determine the first location information is to be valid information. In case that the information of speed at the time of $t_1$ is obtainable, if $(t_1-t_0)*v(t_1)$, the estimated distance of moving during the time interval $t_0$ to $t_1$ is greater than Dmin and smaller than Dmax, the UE may determine the first location information is to be valid information. Meanwhile, when determining the validity of the location information acquired, the UE may check one or more conditions among Tmin, Tmax, Dmin and Dmax is satisfied. However, Dmin and Dmax may be used only in case that the UE is available to acquire the information of UE speed at a specific time.

The UE checks the validity of the first location information acquired. In case that the UE determines the corresponding location information to be valid, the UE transmits the information based on a first location estimation to the network (S1522). The information based on the first location estimation may include the first location information which is the location information at the time of $t_1$ and the first time information for the time $t_1$. In case that the UE is able to detect the speed $v(t_1)$ at the time of $t_1$, the information based on the first location estimation may further include the first speed information which is the speed of UE at the time of $t_1$.

The UE acquires the second location information, and determines whether or not to report it (S1531). The second location information may be the location information acquired through the positioning technique described above at the specific time $t_2$. The second location information may be the location information that indicates the actual geographic location of UE at the specific time $t_2$ or the information for acquiring actual geographic location of UE. After acquiring the second location information, the UE may determine whether to report the second location information to the network. Determining whether to report the second location information may be to check if the second location information to be valid information.

In the step, S1531, the time of acquiring the second location information is the time of acquiring location information following acquiring the first location information. Accordingly, when performing the step, S1531, the UE may perform it after at least the time Tmin has lapsed. Therefore, in checking the validity of the second location information, if the time interval between the time of $t_1$ and the time of $t_2$ is greater than Tmin and smaller than Tmax, the UE may determine the second location information to be valid information. In case that the information of the speed $v(t_2)$ at the time of $t_2$ is obtainable, and if $(t_2-t_1)*v(t_1)$, the estimated distance of moving during the time interval $t_1$ to $t_2$ is greater than Dmin and smaller than Dmax, the UE may determine the second location information is to be valid information. Meanwhile, when determining the validity of the location information acquired, the UE may check one or more condition among Tmin, Tmax, Dmin and Dmax is satisfied.

The UE checks the validity of the second location information acquired. In case that the UE determines the corresponding location information to be valid, the UE transmits the information based on a second location estimation to the network (S1532). The information based on the second location estimation may include the second location information which is the location information at the time of $t_2$ and the second time information for the time $t_2$. In case that the UE is able to detect the speed at the time of $t_2$, the information based on the second location estimation may further include the second speed information which is the speed of UE at the time of $t_2$.

In the example depicted in FIG. 15, although the UE transmits the information based on the first and second location estimation through two steps of S1522 and S1523, the UE may transmit the information based on the location estimation in two or more times. The number that the UE provides the information based on the location estimation may be preset to the UE or setup to the UE by the network.

In the example shown in FIG. 15, in case that the UE determines that the first location information or the second information acquired by the steps, 1521 or S1531 respectively is not valid, the UE may stop the next procedures related to reporting the information based on the location estimation to the network. In this case, the UE may send the failure indication message of acquiring initial location information to the network and notify that it will stop the related procedures.

The network acquires two or more pieces of the information based on the location estimation from the UE, and estimates the location information at $t_0$ based on this (S1540). The UE may estimate the location at $t_0$ through the interpolation and/or extrapolation by using at least one of the location information, the time information and the speed information at different times included in the information based on the location estimation acquired.

In the embodiment of the present invention, initiating the positioning in order to transmit the information based on the location estimation to the network by the UE that has reported only the measurement result without the related location information may be performed by the instruction of the network that is reported only the measurement result without the related location information. In this case, the additional positioning instruction message that instructs to provide the information based on the location estimation by the network may include at least one of the positioning number performed by the UE and the interpolation parameter described above.

In case that the UE acquires the measurement result but cannot report the location information together, it may be configured that the UE itself performs the positioning later and transmits the information based on the location estimation to the network. In this case, the number of positioning performed by the UE and the interpolation parameters required when reporting the information based on the location estimation may be provided by the network or preset to the UE.

Transmitting the information based on the location estimation to the network by the UE itself that has reported only the measurement result without the location information may be configured by separate signaling included in the MDT measurement configuration. When the UE receives the MDT measurement configuration and fails to acquire the location information, only in case that there is the signaling information that instructs to provide the information based on the location estimation, the UE may perform the operation described above. In this time, the MDT measurement configuration may include the positioning number performed by the UE and the information for configuring the interpolation parameter.

Figure 16:
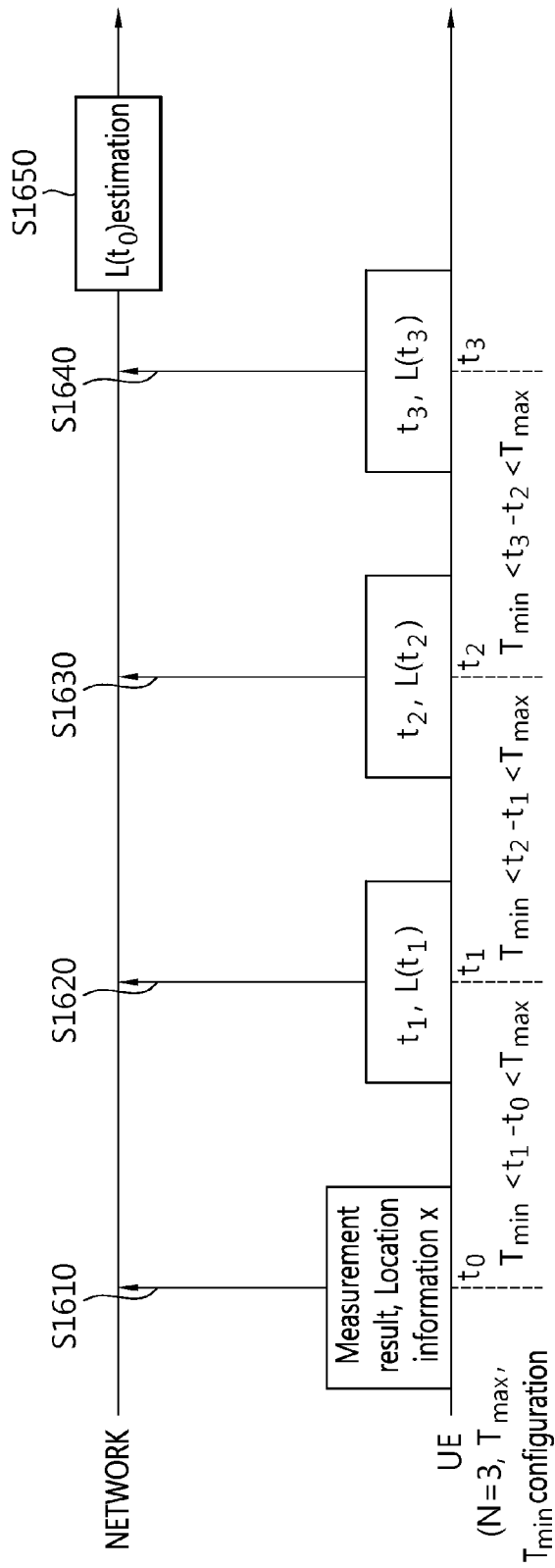
FIG. 16 is a drawing illustrating an example of a location estimation method according to an embodiment of the present invention.

FIG. 16 is a drawing illustrating an example of a location estimation method according to an embodiment of the present invention.

In the example of FIG. 16, it is assumed that the number N which is the number that the UE provides the information based on the location estimation to network is configured as 3, and the UE is provided with the configuration of interpolation parameters, Tmax and Tmin in advance.

The UE acquires the measurement result at the time of $t_0$ and report it to the network (S1610). The UE is not able to acquire the location information through positioning at the time of $t_0$, and may not report the location information together with the measurement result. As such, in case that the UE reports only the measurement result without the location information to the network, the UE may decide to start the positioning later in order to provide the information based on the location estimation to the network on its own.

After the least time interval indicated by Tmin from the time of $t_0$ has lapsed, the UE acquires the location information $L(t_1)$ through positioning at the time of $t_1$. The UE may check the validity of the location information $L(t_1)$ based on the interpolation parameter, and determine whether it reports the information based on the location estimation to the network. Since the time interval $t_1-t_0$ between the time $t_0$ and $t_1$ is greater than Tmin and smaller than Tmax, the UE may determine $L(t_1)$ is valid and decide whether to report the information based on the location estimation to the network. Accordingly, the UE transmits the information based on the location estimation including the time information at $t_1$ and the location information of $L(t_1)$ to the network (S1620).

The UE, after the least time interval indicated by Tmin from the time of $t_1$ has lapsed, acquires the location information $L(t_2)$ through positioning at the time of $t_2$. Since the time interval $t_2-t_1$ between the time $t_1$ and $t_2$ is greater than Tmin and smaller than Tmax, the UE may determine $L(t_2)$ is valid and decide whether to report the information based on the location estimation to the network. Accordingly, the UE transmits the information based on the location estimation including the time information at $t_2$ and the location information of $L(t_2)$ to the network (S1630).

After the least time interval indicated by Tmin from the time of $t_2$ has lapsed, the UE acquires the location information $L(t_3)$ through positioning at the time of $t_3$. Since the time interval $t_3-t_2$ between the time $t_2$ and $t_3$ is greater than Tmin and smaller than Tmax, the UE may determine $L(t_3)$ is valid and whether decide to report the information based on the location estimation to the network. Accordingly, the UE transmits the information based on the location estimation including the time information at $t_3$ and the location information of $L(t_3)$ to the network (S1640).

The network may estimate the location information $L(t_0)$ at the time of $t_0$ based on $\{t_1, L(t_1)\}$, $\{t_2, L(t_2)\}$, and $\{t_3, L(t_3)\}$ which are the information based on the location estimation (S1650). Through this, the network may acquire the location information through the estimation although the network is reported about the measurement result at the time of $t_0$ but not reported about the related location information.

Figure 17:
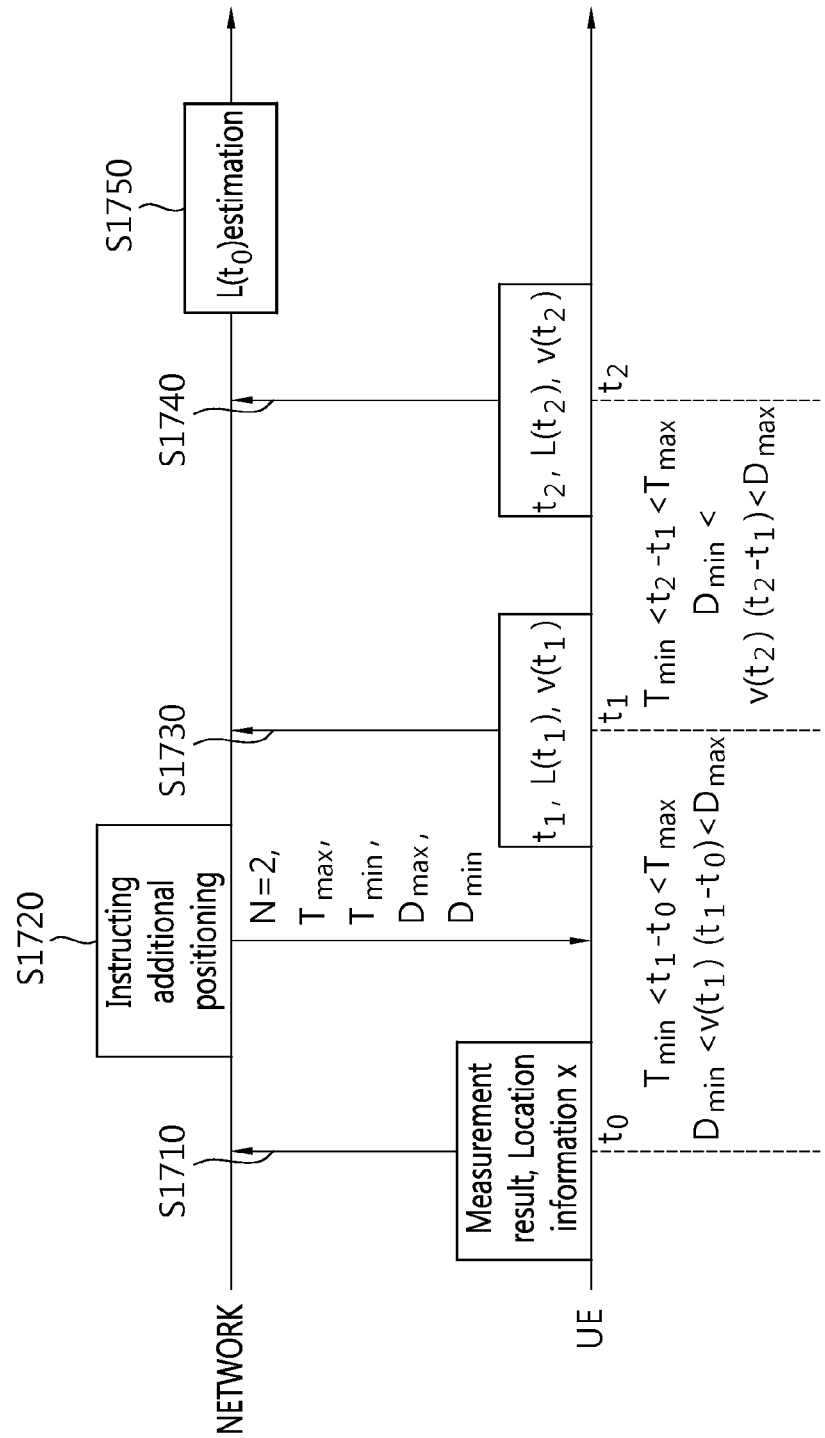
FIG. 17 is a drawing illustrating another example of a location estimation method according to an embodiment of the present invention.

FIG. 17 is a drawing illustrating another example of a location estimation method according to an embodiment of the present invention.

In the example of FIG. 17, a UE acquires the measurement result at the time of $t_0$ and report it to network (S1710). The UE is not able to acquire the location information related to the measurement result at the time of $t_0$, and may report the measurement result without the location information.

The network that is reported only about the measurement result without the location information from the UE transmits the additional positioning instruction message that instructs to transmit the information based on the location estimation by additionally performing the positioning by the UE to the UE in order to acquire the information based on the location estimation for location estimation at the time of $t_0$ (S1720). The additional positioning instruction message may include the information that indicates the number N of reporting the information based on the location estimation by the UE and the interpolation parameters. In this example, N may be set to 2, and Tmax, Tmin, Dmax and Dmin may be setup as the interpolation parameters.

After the least time interval indicated by Tmin from the time of $t_0$ has lapsed, the UE acquires the location information $L(t_1)$ through positioning at the time of $t_1$. In addition, if the speed is measurable, the UE may acquire $v(t_1)$ which is the speed information at the time of $t_1$. The UE may determine whether to report the information based on the location estimation including the location information $L(t_1)$ to the network based on the interpolation parameters. In relation to Tmin and Tmax which are the interpolation parameters for time, the UE may check if the time interval $t_1-t_0$ between the time $t_0$ and $t_1$ is greater than Tmin and smaller than Tmax. If the information for the speed of UE is obtainable and Dmin and Dmax which are the interpolation parameters for distance are acquired, the UE may check $v(t_1)*(t_1-t_0)$ which is the distance that the UE moves for $t_0$ to $t_1$ is greater than Dmin and smaller than Dmax. If the two conditions are satisfied, the UE may decide to report the information based on the location estimation to the network. Accordingly, the UE transmits the information based on the location estimation including the time information for $t_1$, the location information for $L(t_1)$ and the speed information for $v(t_1)$ to the network (S1730).

After the least time interval indicated by Tmin from the time of $t_1$ has lapsed, the UE acquires the location information $L(t_2)$ through positioning at the time of $t_2$. In relation to Tmin and Tmax which are the interpolation parameters for time, the UE may check if the time interval $t_2-t_1$ between the time $t_1$ and $t_2$ is greater than Tmin and smaller than Tmax. If the information for the speed of UE is obtainable and Dmin and Dmax which are the interpolation parameters for distance are acquired, the UE may check $v(t_2)*(t_2-t_1)$ which is the distance that the UE moves for $t_1$ to $t_2$ is greater than Dmin and smaller than Dmax. If the two conditions are satisfied, the UE may decide to report the information based on the location estimation to the network. Accordingly, the UE transmits the information based on the location estimation including the time information for $t_2$, the location information for $L(t_2)$ and the speed information for $v(t_2)$ to the network (S1740).

The network may estimate the location information $L(t_0)$ at the time of $t_0$ based on $\{t_1, v(t_1)\}$ and $\{t_2, L(t_2), v(t_2)\}$ which are the information based on the location estimation (S1750). Through this, the network may acquire the location information through the estimation although the network is reported about the measurement result at the time of $t_0$ but not reported about the related location information.

Figure 18:
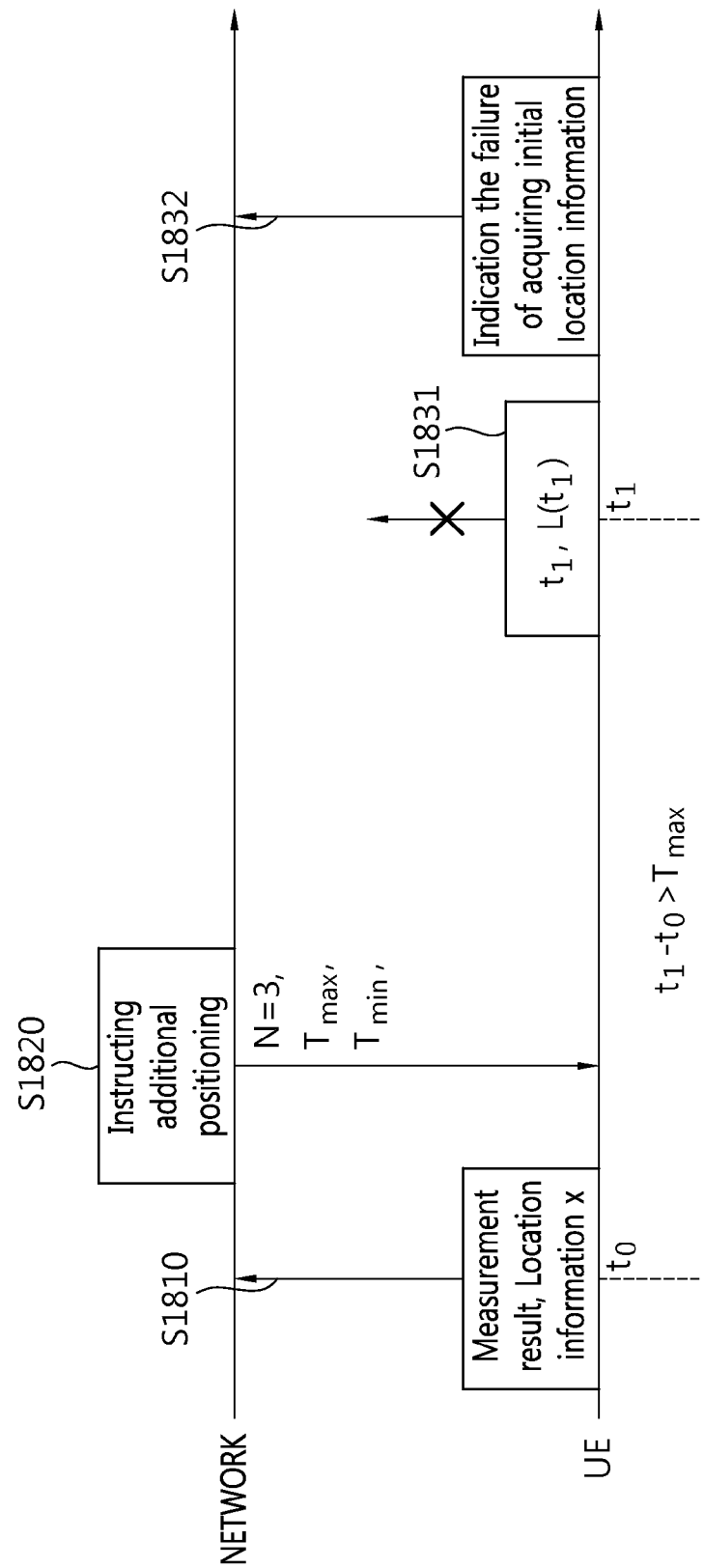
FIG. 18 is a drawing illustrating still another example of a location estimation method according to an embodiment of the present invention.

FIG. 18 is a drawing illustrating still another example of a location estimation method according to an embodiment of the present invention.

In the example of FIG. 18, a UE acquires the measurement result at the time of $t_0$ and report it to network (S1710). The UE is not able to acquire the location information related to the measurement result at the time of $t_0$, and may report the measurement result without the location information.

The network that is reported only about the measurement result without the location information from the UE transmits the additional positioning instruction message that instructs to transmit the information based on the location estimation by additionally performing the positioning by the UE to the UE in order to acquire the information based on the location estimation for location estimation at the time of $t_0$ (S1820). The instruction message for reporting information based on the location estimation may include the information that indicates the number N of reporting the information based on the location estimation by the UE and the interpolation parameters. In this example, N may be set to 3, and Tmax and Tmin may be setup as the interpolation parameters.

After the least time interval indicated by Tmin from the time of $t_0$ has lapsed, the UE acquires the location information $L(t_1)$ through positioning at the time of $t_1$. The UE may determine whether to report the information based on the location estimation including the location information $L(t_1)$ to the network based on the interpolation parameters. Since the time interval $t_1-t_0$ between the time $t_0$ and $t_1$ is greater than Tmax, the UE may determine that $L(t_1)$ is not valid location information, and not to report the information based on the location estimation to the network (S1831).

The UE that determines not to report the information based on the location estimation to the network may transmit the message indicating failure of acquiring initial location information to the network (S1832). In this case, the network may not acquire the location information related to the measurement result at the time of $t_0$.

According to the embodiments of the present invention, even in the case that the relevant location information has not been acquired until reporting the measurement result, the network is available to estimate the location in relation to the measurement result through the information based on the location estimation. Accordingly, the network performs the optimization based on the measurement result received and the location information estimated to provide relatively high-quality service for the UE.

Meanwhile, in case of acquiring the location information after lots of time has been lapsed from the time of acquiring the measurement result, the relationship between the location information acquired and the location information related to the measurement result may be lowered. In addition, in case that the UE moves long distance between the time of acquiring the measurement result and the time of acquiring location information, the relationship between the location information acquired and the location information related to the measurement result may be lowered. In case that such a location information is reported to the network, the location information related to the measurement result is wrongly estimated, and consequently, it causes the problem of deteriorating the network optimization instead. In order to compensate it, in the embodiments of the present invention, the validity of the location information which is to be reported through applying the interpolation parameters is determined, which brings about more precise location estimation result by the network.

Figure 19:
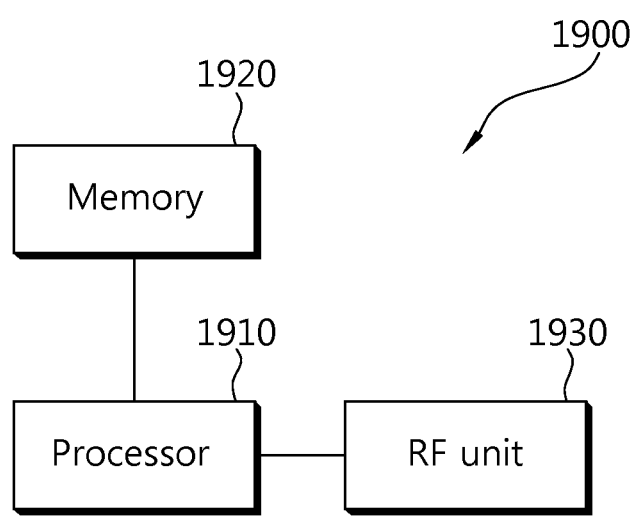
FIG. 19 is a block diagram illustrating the wireless apparatus that an embodiment of the present invention can be implemented.

FIG. 19 is a block diagram illustrating the wireless apparatus that an embodiment of the present invention can be implemented. The apparatus may be implemented to perform the cell reselection method according to the embodiments of the present invention with reference to FIG. 16 to FIG. 18.

The wireless apparatus 1900 includes a processor 1910, a memory 1920 and a RF unit 1930. The processor 1910 implements the proposed functions, processes and/or methods. The processor 1910 may be configured to acquire the location information as a predetermined time, and to check the validity of the location information. The processor 1910 may be configured to report the information based on the location information estimation. The processor 1910 can be configured to estimate the location related to the measurement result based on at least a piece of the location information acquired through receiving the information based on the location estimation. The processor may be configured to implement the aforementioned embodiments with reference to FIG. 16 to FIG. 18.

The RF unit 1930 transmits and receives the radio signal with being connection to the processor 1910.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include baseband circuits for processing radio signals. When the embodiment is implemented in software, the aforementioned scheme may be implemented as a module (process or function) that performs the aforementioned function. The module may be stored in the memory and executed by the processor. The memory may be placed inside or outside the processor and may be connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method for reporting information based on a location estimation performed by a user equipment (UE) in a wireless communication system, the method comprising:
   transmitting, by the UE, a measurement result at a specific time to a network;
   acquiring, by the UE, an interpolation parameter which includes a parameter indicating a maximum moving distance of the UE from the network;
   acquiring, by the UE, information based on a first location estimation which includes information on a first location of the UE at a first time and information on the first time;
   transmitting, by the UE, the information based on the first location estimation to the network when a first moving distance of the UE between the specific time and the first time is smaller than the maximum moving distance;
   acquiring, by the UE, information based on a second location estimation which includes information on a second location of the UE at a second time and information on the second time; and
   transmitting, by the UE, the information based on the second location estimation to the network when a second moving distance of the UE between the first time and the second time is smaller than the maximum moving distance,
   wherein the first moving distance of the UE between the specific time and the first time is proportional to a velocity of the UE in a section between the specific time and the first time, and
   wherein the second moving distance of the UE between the first time and the second time is proportional to a velocity of the UE in a section between the first time and the second time.

2. The method of claim 1, wherein when the UE does not transmit location information related to the measurement result with the measurement result, the information based on the first location estimation and the information based on the second location estimation are acquired.

3. The method of claim 1, wherein the interpolation parameter further includes a Tmax parameter that indicates a maximum time interval.

4. The method of claim 3, wherein the information based on the first location estimation is transmitted to the network if a time interval between the specific time and the first time is smaller than the maximum time interval indicated by the Tmax parameter.

5. The method of claim 4, wherein the information based on the second location estimation is transmitted to the network if the information based on the first location estimation is transmitted to the network and a time interval between the first time and the second time is smaller than the maximum time interval indicated by the Tmax parameter.

6. The method of claim 4 further comprising:
transmitting, by the UE, a failure indication message indicating a failure of acquiring initial location information to the network, if at least one of the information based on the first location estimation and the information based on the second location estimation is not transmitted to the network.

7. A user equipment (UE) performing in a wireless communication system, the wireless apparatus comprising:
a radio frequency (RF) unit that transmits and receives a radio signal; and
a processor operating functionally connected with the RF unit,
wherein the process is configured to perform,
transmitting a measurement result at a specific time to a network via the RF unit;
acquiring an interpolation parameter which includes a parameter indicating a maximum moving distance of the UE from the network via the RF unit;
acquiring information based on a first location estimation which includes information on a first location of the UE at a first time and information on the first time via the RF unit;
transmitting the information based on the first location estimation to the network via the RF unit when a first moving distance of the UE between the specific time and the first time is smaller than the maximum moving distance;
acquiring the information based on the second location estimation which includes information on a second location of the UE at a second time and information on the second time via the RF unit; and
transmitting the information based on the second location estimation to the network via the RF unit when a second moving distance of the UE between the first time and the second time is smaller than the maximum moving distance,
wherein the first moving distance of the UE between the specific time and the first time is proportional to a velocity of the UE in a section between the specific time and the first time, and
wherein the second moving distance of the UE between the first time and the second time is proportional to a velocity of the UE in a section between the first time and the second time.

8. The UE of claim 7, wherein when the UE does not transmit location information related to the measurement result with the measurement result, the information based on the first location estimation and the information based on the second location estimation are acquired.

* * * * *